TELEPHONE EQUIPMENT

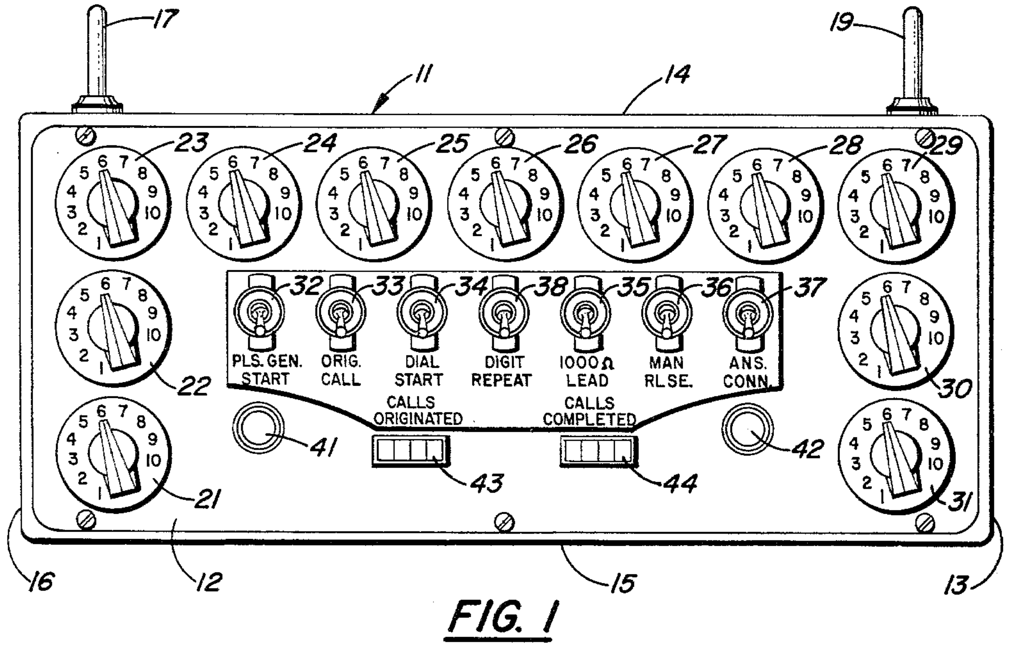
FIG. 1
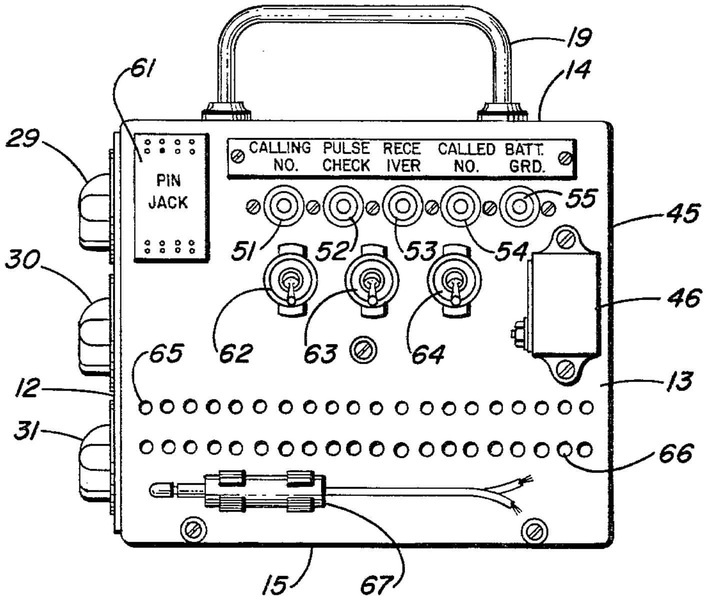
FIG. 2
FIG. 3
| | | |
|---|---|---|
| FIG. 4 | FIG. 6 | FIG. 8 |
| FIG. 5 | FIG. 7 | FIG. 9 |
INVENTOR.
HARRY E. McALLISTER
BY
Jerome R. Cox
ATTORNEY INVENTOR.
HARRY E. McALLISTER
BY
Jerome R. Cox
ATTORNEY March 8, 1966 H. E. McALLISTER 3,239,612

Filed July 30, 1962 7 Sheets-Sheet 3

INVENTOR.
HARRY E. McALLISTER

BY Jerome R. Cox

ATTORNEY

INVENTOR
HARRY E. McALLISTER
BY
Jerome R. Cox
ATTORNEY

INVENTOR.
HARRY E. McALLISTER
BY
Jerome R. Cox
ATTORNEY

March 8, 1966 H. E. McALLISTER 3,239,612

TELEPHONE EQUIPMENT

Filed July 30, 1962 7 Sheets-Sheet 6

INVENTOR.
HARRY E. McALLISTER
BY
Jerome R. Cox
ATTORNEY

INVENTOR.
HARRY E. McALLISTER
BY
Jerome R. Cox
ATTORNEY 3,239,612
TELEPHONE EQUIPMENT
Harry E. McAllister, 3201 Bonnieview Drive, Rte. 5, Lima, Ohio
Filed July 30, 1962, Ser. No. 213,315
6 Claims. (Cl. 179—175.2)

The invention disclosed and claimed in this application relates to telephone equipment. In illustration of the invention, I have disclosed an apparatus designed for the purpose of testing the operating telephone circuits, switches and other equipment of a telephone system to determine the efficiency thereof and to locate faults therein.

*Objects*

One of the objects of my invention is to provide testing equipment operative to dial selected numbers automatically and continuously without supervision until a fault is encountered and thereupon to seize such faulty equipment and hold it until supervising personnel can locate and correct such fault.

A further object of my invention is to provide a device which will operate the dial central office equipment exactly as a subscriber on the exchange would operate the central office equipment in dialing for any number that he or she may wish to dial and that is served by the central office equipment, operating the central office equipment under the same conditions as encountered by a subscriber, that is, under both light load or heavy load conditions.

A further object of my invention is to provide a device which will test the complete train of the central office equipment at the same time, just as a subscriber would do in dialing a number.

A further object of my invention is to provide equipment to test dial telephone central office equipment to determine the grade of service the subscribers attached to the dial central office equipment are receiving, and to provide information to show the type of service being received—whether one call is lost in 500 attempts, 800 attempts, 1000 attempts, or 2500 attempts, etc It accomplishes these results by continuously dialing, automatically, predetermined or selected numbers without close supervision. These numbers can be any numbers served by the central office equipment. The routiner records the number of calls attempted and the number of calls correctly completed. To this end, two registering meters are provided, one for registering the total number of calls originated and one for registering the total number of calls correctly completed. These meters indicate the physical condition of dialing equipment inasmuch as the number of lost calls can readily be obtained from a comparison of the two meters. Thus by subtracting the calls completed meter reading from the calls originated meter reading, the grade of service being received by the subscribers can be accurately obtained. This information is very necessary from the standpoint of personnel at the executive level.

A further object of my invention is to provide a device by which all elements of the switch train of a telephone central office equipment are tested when connected in the normal manner. In larger offices, the elements concerned are staggering in number. If, for instance, you were in a large telephone exchange say at telephone CAtherine 5–6646 and calling telephone number CAtherine 9–9616, the call would go through a "line finder," a "first selector," a "second selector," a "third selector," and a "connector switch." When the receiver is first lifted to get a dial tone, the call can be picked up by any one of 20 "line finder" switches. Each of these line finder switches has 50 "first selector" switches which actually furnish the dial tone. So at this point, a subscriber has had a possible choice of 20×50, or 1000, possible paths to get the dial tone. The subscriber now dials the CA. This will give him a "second selector" switch; and since each "first selector" switch has a choice of 20 "second selector" switches, we now have had a possible choice of 20×1000, or 20,000 possible paths to reach a "second selector" switch. The subscriber now dials the first 9. This will get a "third selector" switch; and since each "second selector" switch has a choice of 20 "third selector" switches, the subscriber has had a possible choice of 20 times 20,000, or 400,000, possible paths to reach a "third selector" switch. The subscriber next dials the second 9. This will get a "connector switch." Each "third selector" switch has a choice of 20 "connector switches," so that now the subscriber has had a choice of 20 times 400,000, or 8,000,000, possible paths to the "connector switch." He now dials the 616 which is all dialed on the connector switch, and since the subscriber had a choice of 20 connector switches, each one having a choice of the 616, he now has had a choice of 20 times 8,000,000, or 160,000,000, possible paths to reach the number dialed.

On the basis of the above, it is easily seen that the maintenance personnel has a very difficult task to try on a manual basis (i.e. without some device such as that which I have provided) to locate a fault which may be encountered in such a dialing process. At the very best, it is a time and energy consuming process. My automatic dialing routiner eliminates this as it will dial and re-dial until it runs into the fault, and then hold the equipment for the maintenance personnel to locate and correct. It is very valuable in testing out new equipment installations, prior to placing the new equipment into service.

Another object of my invention is to provide an audible signal on direct distance dialing telephone equipment (sometimes herein called DDD telephone equipment) to notify an operator on certain types of such equipment that the call being made is a test call and should not be charged against the telephone being used as the calling number in making such test calls.

A further object of my invention is to provide means for holding all of the parts of a switch train up to the part where a fault is encountered, when a fault is encountered, whether the fault is in the tip, ring, or control leads or otherwise.

A further object of my invention is the provision of means to supply "dead" ground to the control lead whenever a fault is encountered on the tip, ring, or control leads.

A further object of my invention is to provide means to recognize a "stop-dial" condition and prevent further pulsing until this "stop-dial condition is removed.

A further object of my invention is to provide means whereby a multiple line selector may be set so that (1) All test calls will be made from the same test line number;

(2) After each call is made, a new test line number will be selected;

(3) A new test line number will be selected after 5 calls have been made from the same test line number; and (4) A new test line number will be made after 10 calls have been made from the same test line number.

Features of my invention include the following:

(1) It will test the local subscriber's central office dial equipment.

(2) It will test the toll dial central office equipment.

(3) It can be attached to any local subscriber's line equipment served by the exchange as the calling number.

(4) It can dial any local subscriber's number served by the exchange as the called number.

(5) It can dial any toll code served by the exchange.

(6) It can be attached to any selector switch in the number or code train.

(7) When a number being dialed has been correctly reached, it will automatically release the switch train and re-dial the number or code. This re-dialing or re-cycling will continued until a failure is encountered.

(8) If the correct number or code is not reached, it will stop dialing.

(9) When the dialing is stopped for any reason, an uninterrupted alarm is sounded.

(10) It registers the number of calls originated.

(11) It registers the number of calls completed.

(12) It will release the switch train and re-dial the number or code upon the receipt of an A.C. generator current to the "called number" end of the routiner (i.e. ringing current) supplied by the called number.

(13) It will release the switch train and re-dial the number or code upon the receipt of a T–R lead reversal to the "calling number" side of the routiner.

(14) It will not start dialing until the equipment attached to the "calling number" side of the routiner notifies the routiner it is ready to receive the dialing pulses from the routiner.

(15) The dialing pulses are created by a three-relay "free running pulse generator."

(16) A jack is provided to "measure" the correctness of the created pulses by the use of an external pulse meter.

(17) A jack is provided to attach a receiver to the switch train to listen for any busy or equipment butt-in encountered.

(18) A lamp is provided to visually indicate that the pulse generator is running, giving a visible flashing lamp signal.

(19) A lamp is provided to visually indicate that the "connector switch" is prepared to be answered.

(20) It provides a "hold ground" to hold the switch train if a fault is encountered on the T–R and C leads during dialing.

(21) It may be released manually.

(22) An attendant, after placing the routiner in operation, is no longer required until a fault is encountered. This fault will be indicated by the sounding of the uninterrupted alarm.

(23) While the embodiment illustrated shows a device which can dial a number containing a total of ten digits, more switches can be added if desired so as to dial a total of more than ten digits. The equipment can transmit 1 to 10 (or more) digits.

(24) The dialing can be limited to any number of switches up to the total provided by the device simply by setting a "trunk off" switch to the total number of digits contained in the number to be dialed. The number of digits being dialed can be manually controlled, simply by setting the "trunk off" switch on position #1 and then advancing it one step at a time as each digit has been dialed, until the total digits desired have been dialed. This feature allows the maintenance personnel to examine each individual piece of equipment for proper functioning as it is being dialed.

(25) Timing between digits is variable, being controlled by the setting of the 10,000 ohm variable resistor in series with the 500 mf. electrolytic condenser and the relay D.

(26) Adequate contact spark protection is provided.

(27) The routiner may be used to dial from any part of the "switch train" used in the "calling number" equipment, by attaching the tip-ring-sleeve wires of the cord used for the "calling number" equipment to the tip-ring-C leads respectively of the desired switch.

(28) The audible alarm will sound intermittently as long as the dialing is proceeding, thus giving maintenance personnel an audible indication that the dialing is proceeding.

(29) No highly trained personnel are required to maintain the simplified apparatus and circuit.

(30) The apparatus creates and transmits pulses.

(31) The apparatus will not transmit pulses until the dial equipment is ready to receive them, and for this it does not depend upon receipt of the dial tone.

(32) Manual pulsing can be used with a test telephone plugged into the receiver jack, which operation is valuable for testing the differences of operation of certain types of equipment.

(33) A test telephone can be plugged into the receiver jack and can be used to listen or talk during or after the sending of one or more digits, which is valuable for checking "busys" or "butt-ins."

(34) When the routiner is dialing any number on the exchange, a telephone may be even left on the line and observed to determine whether the bells are ringing properly.

(35) The routiner will re-cycle upon the receipt of ringing current alone from the connector switch, or wait until both ringing current and current reversal is received from the connector switch.

(36) The routiner will re-cycle when the digit repeat toggle switch is operated to its "on" position and current reversal is received from the telephone equipment.

(37) The routiner tests the connector switch ringing feature.

(38) The routiner tests the connector switch answer feature the same as a subscriber would do on lifting the receiver after the bells have been rung.

(39) The routiner tests the connector switch for current reversal feature which is valuable for toll train equipment tests.

(40) The routiner gives a visible (steady lamp) indication that the current reversal feature of the connector switch is to be used to cause the routiner to release and re-dial.

(41) The routiner will put positive battery forward on the C-lead to hold the switch train for certain types of encountered faults such as open tip, ring, or C leads.

(42) The routiner provides optional loop resistance for seizing the central office equipment.

(43) The routiner will hold a test call through the DDD equipment for a period of time sufficiently long enough to guarantee that the test call will be caused to go to the DDD tapping medium thus causing all of the DDD equipment to be tested.

Further objects and features of my invention should be apparent from the following specification and claims when considered in considered in connection with the accompanying drawings illustrating embodiments of my invention.

*Drawings*

I have illustrated embodiments of my invention in the accompanying drawings wherein:

FIG. 1 is a view in front elevation of routiner apparatus for testing telephonic equipment comprising one embodiment of my invention;

FIG. 2 is a view in end elevation of the routiner apparatus shown in FIG. 1;

FIG. 3 is a diagram showing the relationship of the wiring diagrams of FIGS. 4–9, inclusive, to each other;

*Detailed description*

Figure 4:
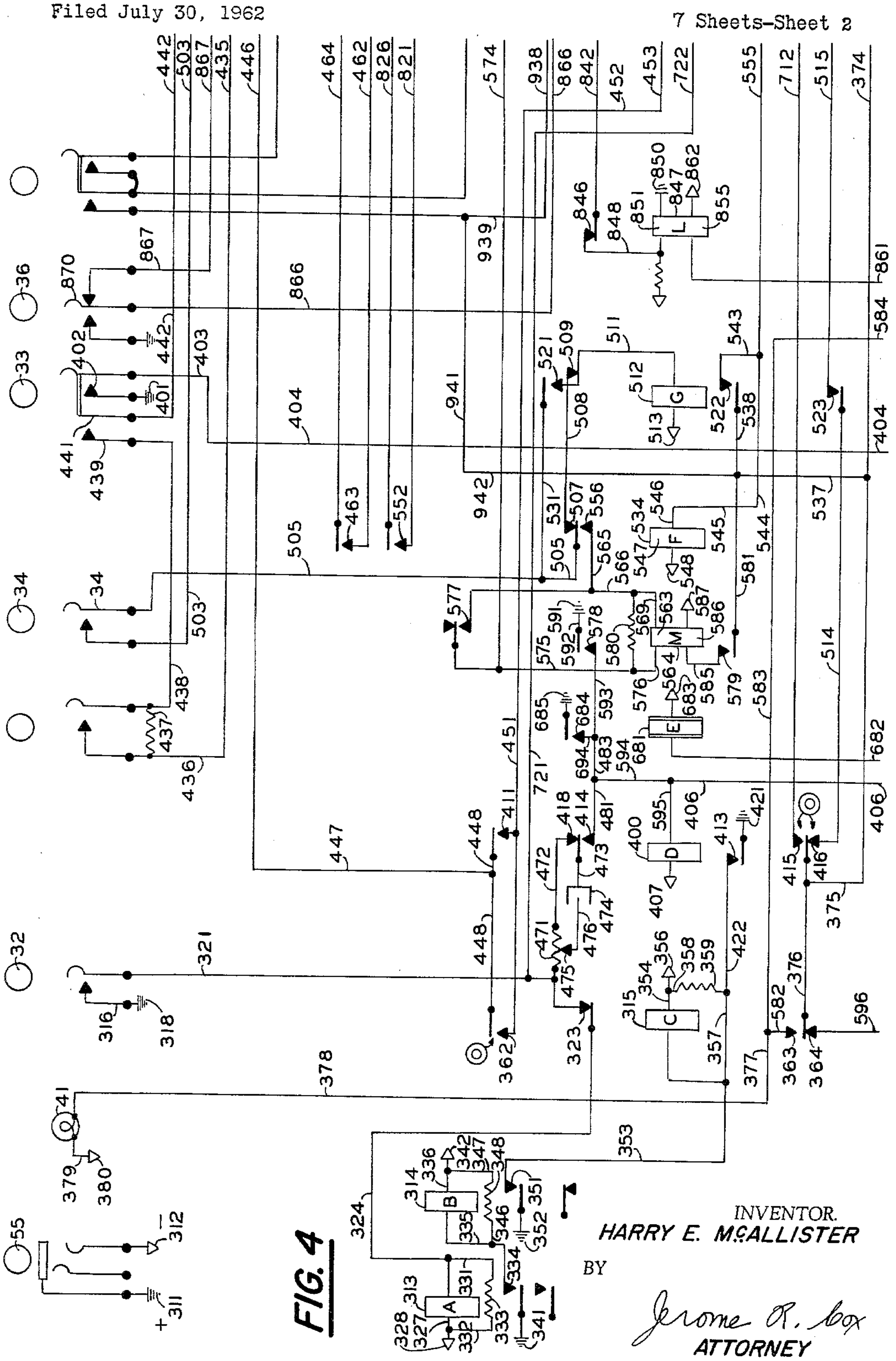
FIG. 4 is a diagram showing the wiring arrangement illustrated in the upper left of the complete wiring diagram.

Referring specifically to FIGURES 1 and 2 of the drawings, I have shown in FIG. 1 a front view of my dialing routiner. As may be seen, it comprises a casing 11 having a front panel 12. It has a side panel 13 and an upper face 14. It has a bottom face 15 and second end face 16. The upper face 14 is provided with two handles 17 and 19. On the front panel 12 there are provided digit switches 21, 22, 23, 24, 25, 26, 27, 28, 29 and 30, and trunk off switch 31. There are also provided a pulse generating starter toggle switch 32, a toggle switch to originate calls 33, a dial start toggle switch 34, a thousand ohm loop toggle switch 35, a manual release toggle switch 36, and an answer connector toggle switch 37 and a digit repeat toggle switch 38. Also provided on the face of the front panel 12 is a pulse generator lamp 41 and an answer connector lamp 42. Also provided on the front panel are indicating meters for calls originated and completed. The indicating meter for the calls originated is designated as 43, the indicating meter for calls completed is designated as 44.

On the opposite side of the unit from the front panel 12 is a rear panel 45 (FIG. 2). On the end panel 13 there is provided an alarm bell 46. Also, on the end panel 13 there are provided five jacks. Thus there is provided a jack 51 for the calling number plug, a jack 52 for the pulse check plug, a jack 53 for the receiver plug, a jack 54 for the called number plug, and a jack 55 for the battery plug.

Also, there are provided the pin jack 61 and the toggle switches 62 (switch A), 63 (switch B), and 64 (switch C). There are provided plug jacks 65 and lamp jacks 66. There is provided a jack plug 67.

The pin jack 61 is provided with 60 connections thus providing one connection for each of three wires (tip, ring and control wires) from each of 20 test lines. There is provided one plug jack 65 for each of the 20 test lines and one lamp jack 66 for each of the 20 test lines. The jack plug 67 may be inserted in any one of the plug jacks 65.

*Preparation for operation*

The unit is prepared for operation as described herein in connection with FIG 1 and FIG. 2.

Figure 5:
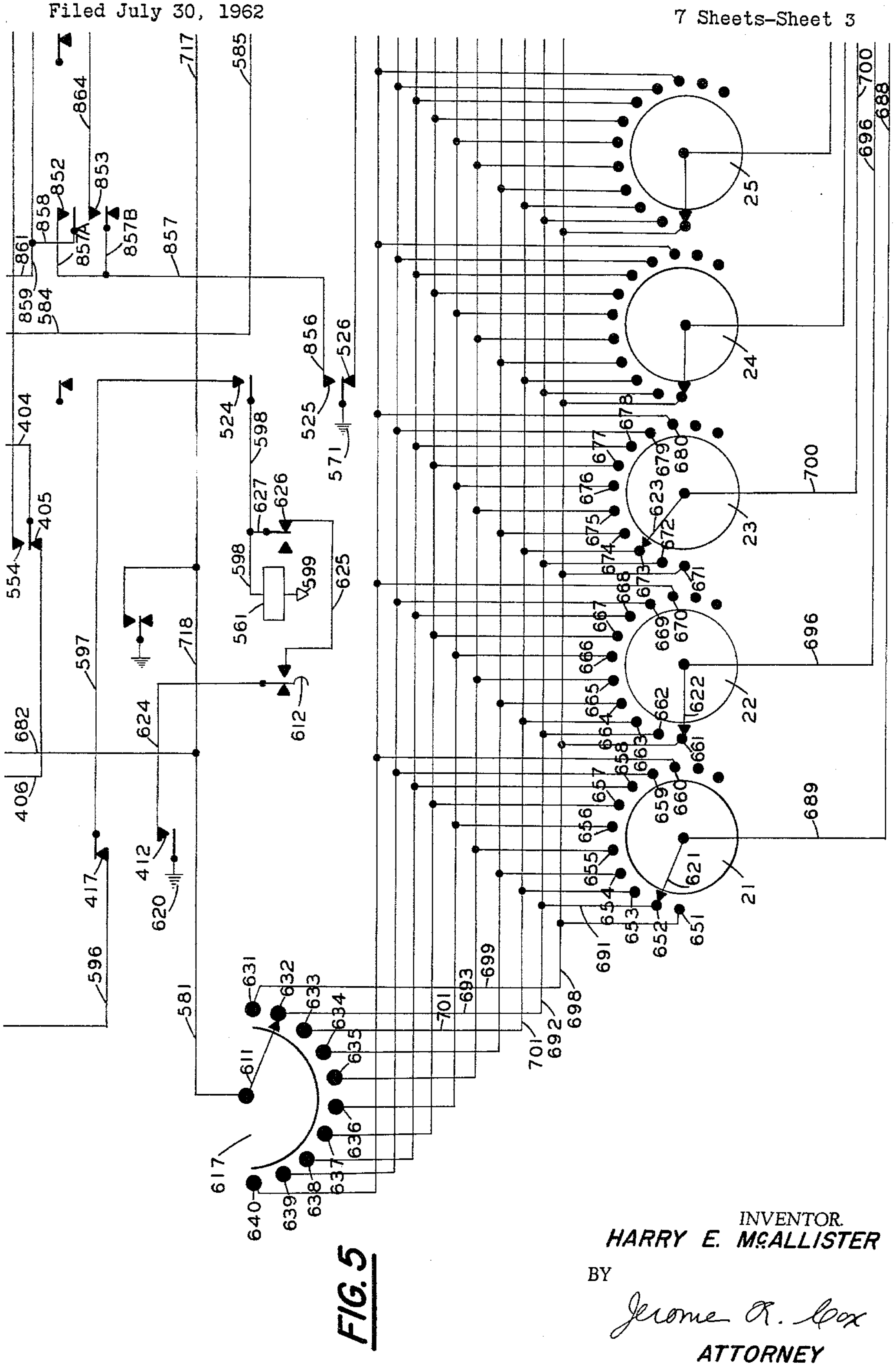
FIG. 5 is a diagram showing the wiring arrangement illustrated in the lower left of the complete wiring diagram.
Figure 6:
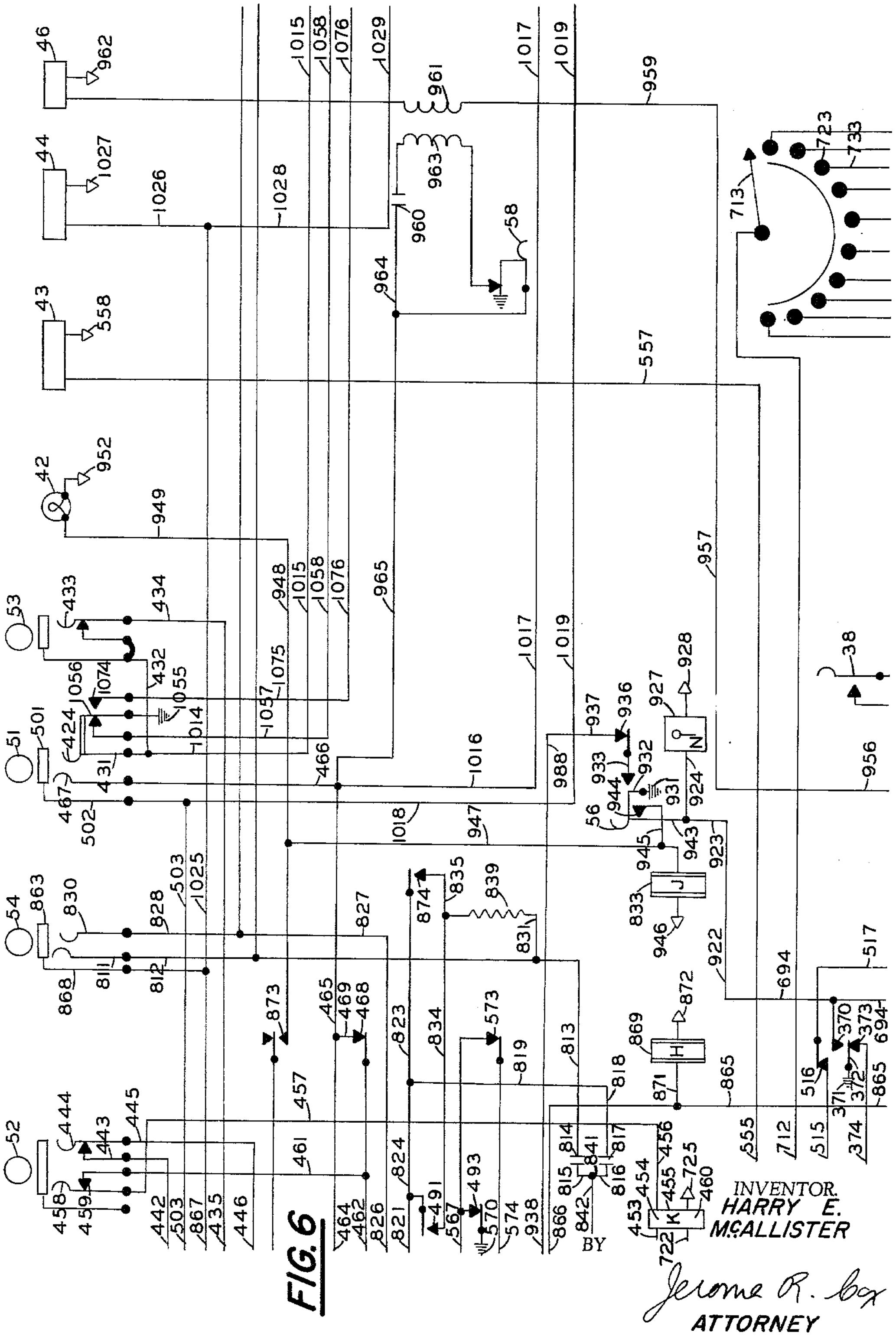
FIG. 6 is a diagram showing the wiring arrangement illustrated in the upper center of the complete wiring diagram.

When the routiner is initially prepared for operation, all seven of the toggle switches 32–38, inclusive, are set to their "off" positions. A battery plug is inserted in the battery ground jack 55 (FIGS. 2 and 4) so that the tip wire of the plug is connected to a negative battery connection and the sleeve wire to positive battery connection or ground. This supplies operating current to the routiner. Next, if we are not using the automatic line selector, a line plug is inserted in the calling number jack 51 (FIGS. 2 and 6). The tip, ring and sleeve wires are connected to the line equipment associated with the number selected to be used as the calling number so that the tip wire is connected to the tip of the line, ring wire to the ring of the line, and the sleeve wire to the C-lead of the line equipment. Next, if we are not using the automatic line selector, a plug is inserted in the called number jack 54 (FIGS. 2 and 6) and the tip and ring wires are connected to the tip and ring respectively of the line equipment associated with the number selected to be used as the called number. Next, the digit switches 21 to 30, inclusive (FIGS. 1, 5 and 7), are set to the various digits contained in the called number (i.e. digit switch 21 is set to the first digit of the number, digit switch 22 to the second digit of the number, digit switch 23 to the third digit of the number, etc.). Next the trunk off switch 31 (FIGS. 1 and 7) is set to the number corresponding to the total number of digits contained in the selected number to be dialed. Next, the pulse generating starter toggle switch 32 (FIGS. 1 and 4) is moved to its "on" position.

*Pulse generator*

The movement of toggle switch 32 starts the three-relay (relays 313(A), 314(B) and 315(C)—FIG. 4) pulse generator running.

The operation of this pulse generator is now explained with reference especially to FIG. 4 as follows: The jack 55 has a connection 311 to positive ground and a connection 312 to negative battery. The spring 316 of the pulse generator start switch 32 is connected to ground 318 and by means of the switch 32 is connected through the lead 321, relay contacts 323, lead 324 to the relay 313 (relay A) and thence through lead 327 to negative battery connection at 328. This energizes relay 313. Bypass 331–332 connects the lead 324 through resistance 333 with the lead 327. The relay 313(A) controls the relay contacts 334 by which ground 41 is connected through a lead 335 to the relay 314 (relay B), then to a lead 336, and finally to negative battery at 342. Closing of contacts 334 by relay 313(A) thus energizes relay 314(B). A bypass may be provided around relay contacts 334 with a rectifying unit 345 inserted in the bypass to prevent arcing of the contacts 334. Such or similar rectifying units may be provided elsewhere in the various circuits to protect various contacts as desired. Bypass 346–347 connects the lead 335 through resistance 348 with the lead 336.

The energizing of the relay 314(B) closes contacts 351 whereby ground connection 352 is connected through lead 353 to relay 315(C) and through it and lead 354 to negative battery connection 356. This energizes relay 315 (relay C). A bypass connection 357–358 connects lead 353 with lead 354, a resistance 359 being inserted in the bypass 357–358 in order to protect contacts 351. It also increases the release time of the relay 315(C) armature. Similar resistances may be provided elsewhere in the various circuits, if desired, for similar purposes. The energizing of relay 315(C) opens relay contacts 323 and closes a relay contact 362. It also closes relay contact 363 and opens relay contact 364. The effect of the closing of contact 362 and the opening of contact 364 will be disclosed hereafter.

The closing of the contact 363 at appropriate times creates a circuit which flows through lamp 41 and thus illuminates it. The circuit is as follows: Starting at master ground 371 (FIG. 6), through lead 372, normally closed contacts 373, lead 374, lead 375 (FIG. 4), lead 376, contacts 363, leads 582, 377 and 378, lamp 41, lead 379 to negative battery at 380. This causes a flashing of the lamp 41 coincident wtih the energization of the relay 315(C).

The breaking of contact 323, moreover, breaks the connection between the ground at 318 adjacent to the spring 316 of the pulse generating starter switch 32 and the negative battery connection 328 and thus de-energizes relay 313(A). This in turn breaks the contact connection at 334 and de-energizes relay 314(B), and this in turn breaks the contact connection at 351 and de-energizes relay 315 (C). This in turn closes the relay contact 323 and reconnects the ground 318 through the relay contact 323 to energize relay 313(A) again as explained above. Whenever contact 363 closes, the lamp 41 is lit; and when contact 363 is opened, the lamp 41 is extinguished. The cycle is repeated again and again, the flashing of the pulse generator lamp 41 showing at each time of the energizing of relay 315(C). The total time of each cycle bears a relation to the total time of operation of the three relays 313(A), 314(B), and 315(C). Increasing the number of relays or the time of operation of any one or more of them would change the length of the pulsing cycle. This time cycle is effectively used at contact 362 to convey pulses to the calling number jack 51 and the calling number equipment, as will be later described.

*Operation of "originate calls" switch*

The next step in the operation of the routiner is to operate manually the switch to originate calls 33 to a closed position. The switch is shown in FIG. 1 and in FIG. 4. It is a double pole switch and is effective (1) to complete a circuit to energize the relay 400 (relay D) and (2) to complete a circuit through the calling number equipment by means of the calling number jack 51 (FIG. 6) and the line equipment associated therewith.

The toggle switch 33 (FIG. 4) has a ground at 401. The ground 401 of the double pole switch 33 is connected through the subswitch 402 of switch 33 and the lead 403, lead 404, normally closed relay contact 405 (FIG. 5), and lead 406 and lead 595 (FIG. 4) to the relay 400(D), and thus to the negative battery connection 407. The relay 400(D) is thus energized. Operation of the relay 400(D) operates relay contacts 411, 412 (FIG. 5), 413 (FIG. 4), 414, 415, 416, 417 (FIG. 5), and 418 (FIG. 4).

Relay 400(D) operates to close relay contacts 411, 412 (FIG. 5), 413 (FIG. 4), 414 and 415. It operates to break connections at contacts 416, 417 (FIG. 5), and 418 (FIG. 4). The purpose of the contacts 412, 415, 416 and 417 will be described in detail later herein. The closing of the contact 411 is effective in connection with the circuit established through the calling number jack 51 and will be explained shortly. The closing of the contact 413 creates a circuit from the ground 421, through contact 413, through lead 422 and lead 357, through the relay 315(C) to the negative battery connection 356. This energizes relay 315(C) irrespective of the condition of contact 351 (referred to above) and holds relay 315(C) energized so long as relay 400(D) is energized. As previously described, the energization of relay 315(C) closes contact 363 and creates a circuit through the lamp 41 so that the lamp continues shining and breaks relay contact 323 so that pulsing generator relays 313(A) and 314(B) cease to operate. The purpose of the holding of the relay 315(C) from the ground 421 as just described is to insure the uniformity of the length of the first pulse when the pulsing is started for each digit, as will be explained more fully later.

As stated above, the closing of toggle switch 33 also completes a circuit through and to the calling number jack 51 (FIG. 6) and thus the calling number telephone line is seized. The tip wire of the line equipment of the calling number is connected to positive or ground. The tip wire of the calling number plug is thus connected through the tip wire of the calling number to ground and is in turn connected to the tip spring 424 (FIG. 6) of the calling number jack 51. Spring 424 is connected through lead 431, lead 432, tip spring 433 of receiver jack 53, lead 434, lead 435, lead 436 (FIG. 4), resistance 437, lead 438, subsidiary switch 439 of toggle switch 33, spring 441, lead 442, spring 443 (FIG. 6), tip spring 444 of the pulse check jack 52, lead 445, lead 446, lead 447 (FIG. 4), lead 448, relay contact 411 (closed as just explained by relay 400(D)), lead 451, lead 452, and lead 453, upper coil 454 of relay 455 (relay K) (FIG. 6), lead 456, lead 457, ring spring 458 and spring 459 of pulse check jack 52, lead 461, lead 462, relay contacts 463 (FIG. 4), lead 464, lead 465 (FIG. 6), lead 466, and the ring spring 467 of calling number jack 51 which is connected to the ring of the line which is connected to the negative battery. The line equipment has now been seized and, through its operation, a call has now been originated on the telephone equipment which is now ready to receive pulses. Ground is now returned on the sleeve of the calling number plug from the telephone equipment.

It should be noted that the fact that although the relay 400(D) (FIG. 4) is energized and its relay contact 411 is thereby closed, and the relay contact 411 thus is a part of this circuit to the calling number, nevertheless a second path is provided from lead 447 through lead 448, contacts 362 (closed because relay 315(C) is energized), lead 451 to lead 452, etc., and also a second path is sometimes provided from lead 462 (FIG. 6) to spring 467. The contacts 468, when closed as hereinafter described, provide a path from lead 462 through said contacts 468, lead 469, lead 465, lead 466 to ring spring 467 to complete a second circuit to the calling number.

*Operation of relay G*

Thereafter the dial start toggle switch 34 (FIG. 1 and FIG. 4) is manually operated to its closed position. This causes a circuit to be formed from the ground of the sleeve 501 of the calling number jack 51 (FIG. 6) through the sleeve spring 502 of said calling number jack 51, thence through lead 503, dial start switch 34 (FIG. 4), lead 505, relay contact 507, lead 508, contact 509, lead 511, relay 512 (Relay G), and to the negative battery connection 513. This energizes relay 512(G). The energizing of relay 512(G) operates contacts 521, 509, 522, 523, 524 (FIG. 5), 525, and 526. Contacts 509 (FIG. 4) and 526 (FIG. 5) are broken by energization of the relay 512(G). Contacts 521 (FIG. 4), 522, 523, 524 (FIG. 5) and 525 are closed by reason of the energizing of the relay 512(G).

The making of contact 521 which occurs before the breaking of contact 509 provides an alternate path for the flow of current from the lead 505 through lead 531, contact 521, and lead 511 through relay 512(G). Thus, regardless of the breaking of the contact at contacts 507 and 509, relay 512(G) remains energized.

The closing of contact 522 provides a circuit which energizes the coil of the relay 534 (relay F). A ground 371 (FIG. 6) (which is the main ground of the circuit illustrated) is connected through lead 372 and normally closed relay contact 373, to a lead 374, and thence through leads 537 (FIG. 4) and 538, contact 522, leads 543, 544, 545, and 546, coil 547 of relay 534(F), and thence to negative battery connection 548. Relay 534(F) is thus energized. The effect of the operation of contacts 523, 524, 525 and 526 will be explained later.

The lead 543 is also connected to leads 555 and 557 (FIG. 6) and thence to calls originated meter 43, and through it to negative battery at 558, causing meter 43 to register a call originated.

The operation of relay 534(F) (FIG. 4) brakes the relay contact 405 (FIG. 5) and 507 (FIG. 4), makes contact at the normally open relay contact 553, and closes the normally open relay contacts 463, 554 (FIG. 5) and 566 (FIG. 4). The effect of the opening of contacts 507, and the effect of closing the contacts 552, 463, 554 (FIG. 5) and 556 (FIG. 4) will be later described. The breaking of the contact 405 (FIG. 5), however, destroys the circuit from the ground 401 (FIG. 4) to the relay 400(D) and makes the continued energization of that relay depend on the condenser 474 and the circuit from ground 318.

While the contact 414 is open, the ground 318 of the pulse generator starting switch 32 is connected through the spring 316, the lead 321, the 10,000 ohm 2 w. resistance 471, the lead 472, the closed contact 418, and the lead 473 to one end of the condenser 474. The ground 318 is connected through the spring 316, the lead 321, the resistance 471, the movable contact 475 associated with the resistance 471 by which the resistance is adjusted, and the lead 476 to the other side of the condenser 474. This creates a closed circuit across the condenser 474 causing the condenser 474 to become discharged. When the contact 414 is closed and the contact 418 is opened, the condenser 474 becomes charged; and during the charging period, the relay 400(D) is held activated until condenser 474 becomes charged.

*Hold feature*

When the relay 512(G) is energized as stated above, it closes normally open relay contacts 523 and 524 (FIG. 5) which are in the control circuits of minor switch magnets 561 and 562 (FIG. 7) controlling the moving of wipers hereinafter described. This operation will be described more fully later. The closing of contacts 556 (FIG. 4) by relay 534(F) creates a connection from the ground of the sleeve 501 (FIG. 6) of the calling number jacket 51 (i.e. the telephone equipment) to the upper coil 563 (the 750 ohm coil) of the relay 564 (relay M) (FIG. 4). This connection leads from the ground of the sleeve 501 (FIG. 6) through leads 502 and 503, the dial start switch 34 (FIG. 4), the lead 505, the contacts 556 (closed as just stated above by relay 534(F)), the leads 565, and 566, the lead 569 to said upper coil 563. Ground is also supplied to the opposite side of said coil from the routiner from a ground 570 (FIG. 6) through normally closed contact 493, lead 567, normally closed contact 573, and leads 574, 575 (FIG. 4) and 576. Thus the coil 563 is normally not energized.

The 750 ohm coil 563 of relay 564(M) thus has ground from the routiner on one terminal and ground from the pulse responsive equipment over the control lead of the calling number on the other terminal. The control lead is also connected through lead 531, contact 521, and lead 511 to one terminal of relay 512(G). Relay 564(M) is thus prevented from operating in series with relay 513(G) due to the ground on the control lead. However, if the ground on the control lead should disappear, even momentarily, for any reason, then relay 564(M) will operate in series with relay coil 512(G). Thus the ground at 570 (FIG. 6) is forwarded by contact 493, lead 567, contact 573, leads 574 and 575 (FIG. 4), lead 576, coil 563, lead 569 (or alternatively resistor 580) to lead 566 and thence by lead 565, contacts 556, lead 505, lead 531, contact 521 (if the contact 521 is closed), lead 511 and relay 512(G) to negative battery at 513. At the same time, the ground at 570 (FIG. 6) will be forwarded by part of the same route to the telephone equipment through the calling number. Thus the ground at 570 (FIG. 6) is forwarded by contact 493, lead 567, contact 573, leads 574 and 575 (FIG. 4), lead 576, coil 563, lead 569 ( or alterantively resistor 580) to lead 566 and thence by lead 565, contacts 556, lead 505, dial start toggle 34, lead 503, lead 502 (FIG. 6) to calling number jack sleeve 501. Thus the 1,000 ohm ground is forwarded to the pulse responsive equipment control lead and this ground prevents the release of the pulse responsive equipment, which would have occurred if this ground had not been available. When relay 564(M) (FIG. 4) operates, it closes contact 579 and thus energizes its 1300 ohm coil 586 and locks up through said coal 586. Relay 564(M) also closes contact 577 which replaces the resistance ground with "dead" ground to the control lead. All parts of the pulse responsive equipment involved in the failure will now be "held" until the cause of the failure is located by the maintenance personnel, at which time the pulse responsive equipment is manually released and testing is resumed.

*Stop dial feature*

In some instances, when a call is made from a telephone, certain parts of the pulse responsive equipment is used only during the time the actual pulsing of the equipment takes place. Therefore, these parts of the equipment are used by all telephones served by the equipment on a "common" basis. Thus when making a call from a telephone, it may be possible that all these common parts of the equipment will be in use at the time that the call is being attempted and this particular call will have to wait until one of the common parts of the equipment becomes idle. If the attempted call were to be continued before one of the common parts where available, then a part of one or more of the digits being dialed would be lost and a wrong number would be reached. To prevent this from happening, the common equipment causes a condition called a "stop-dial" condition to exist during the waiting period when no common part equipment is available. The automatic dialing routiner and grade of service recorded test unit now has a feature incorporated into it that will recognize this stop-dial condition and prevent further pulsing until the stop-dial condition is removed. This feature operates as follows:

Normally the pulse responsive equipment has resistance ground (positive polarity battery) on the tip lead and resistance battery (negative polarity battery) on the ring lead. The stop-dial condition is just the reverse of the normal condition, that is, resistance battery will appear on the tip lead and resistance ground will appear on the ring lead. Thus negative battery will appear at 424 (FIG. 6) and ground will appear at 467. The 333 ohm coil 454 of relay 455(K) is connected in series with the tip-ring leads 424 and 467 to the pulse responsive equipment but relay 455(K) will not normally operate because the 333 ohm coil current is opposing the 3000 ohm coil 460 current when the tip-ring leads are normal. However, when the stop-dial condition occurs the tip-ring leads will be reversed and the 333 ohm coil current will now aid the 3000 ohm coil current and relay 455(K) will operate.

When relay 455 (relay K) operates it closes contacts at 491 and 492 (FIG. 7) and opens contacts at 493 (FIG. 6). The closing of contacts at 492 (FIG. 7) connects ground 490 to relay E (681) (FIG. 4) as will be later detailed. Energerization of 681 (E) closes contacts 684 and thus connects ground at 685 through contact 684, leads 694, 483, 594, 595, to relay 400(D) and negative battery 407 thus energizing relay 400(D). Ground 490 is connected through contact 492 leads 717, 718, (FIG. 5), and 682 to relay 681(E) (FIG. 4) and thence to negative ground at 683.

When relay 400(D) operates it maintains contacts 411 and 413 closed and causes relay 315(C) to remain energized which causes the routiner to stop pulsing the pulse responsive equipment. When the stop-dial condition is removed and the tip-ring leads revert back to normal, relay 455(K) (FIG. 6) will restore to its normal unenergized condition which will allow relay 681(E) (FIG. 4) to restore to normal and in turn allow relay 400(D) to restore to normal and pulsing will be resumed. Relay 455(K) (FIG. 6) in operating the contacts 492 (FIG. 7) also connects ground at 490 to alarm 46 (FIG. 6) causing it to sound, thus notifying the maintenance personnel that the stop-dial condition has been encountered. This circuit runs from ground 490 through contacts 492, leads 716, 956, 957, and 959, coil 961, alarm 46 to negative battery at 962.

As explained above, as long as ground is supplied to coil 564 (relay M) (FIG. 4) from the telephone equipment as detailed above no current flows through said coil 563. However, should ground fail in the telephone equipment (at a time when the telephone equipment has been seized as explained above and relays 512(G) and 534(F) have been energized), the coil 563 of relay 564(M) is energized. The energization of coil 563 of relay 564(M) operates to make connections at contacts 577, 578 and 579. The closing of contact 577 shorts out the 1000 ohm resistor (580) and also the coil 563 of relay 564 and prevents any current flowing either through coil 563 or resistor 580. As stated above, the making of the contact at 579 creates a circuit from the master ground 371 (FIG. 6) to coil 586 of relay M (FIG. 4). This runs from ground 371 (FIG. 6) through lead 372, contact 373, leads 374, 537 (FIG. 4), 581, through contacts 579, lead 585, the lower coil 586 of relay 564(M) to negative battery at 587. This energizes coil 586 and hold the contacts 577, 578, 579 closed. The relay 564(M) is thus positively held energized until manually released as later explained. The closing of the contact 577 supplies ground from 570 (FIG. 6) to the telephone equipment as explained so that the telephone equipment is held until operating personnel can check the equipment and find the reason for the failure of ground. The making of the contact at 578 (FIG. 4) creates a circuit from ground 591 through lead 592, contacts 578, leads 593, 483, 594 and 595 to relay 400(D) and negative battery 407. This holds relay 400(D) energized.

*Operation of relay F (534)*

Relay contacts 405 (FIG. 5) are broken by the operation of relay 534(F) (FIG. 4) and thus normally (inasmuch as relay 564(M) is not normally energized and therefore contacts 578 are still open) de-energizes relay 400(D). However, relay 400(D) is held energized for a short time by the capacitor 474 as explained, the time depending upon the adjustment of a variable resistor associated with the capacitor.

The other relay contacts controlled by relay 534(F) (i.e. contacts 463 (FIG. 4), 507, 556, 552 and 554 (FIG. 5)) have the following effects when 534(F) (FIG. 4) is energized: The breaking of the relay contact 507 has no effect because at such time the circuit from 505 to relay 512(G) (which previously passed through contacts 507, lead 508, contact 509, lead 511, to the relay 512 and negative battery connection 513) is now complete from lead 505 through lead 531, relay contacts 521 (closed by the relay 512(G)), lead 511, relay 512(G) and negative battery connection 513). Contacts 521 are closed before contacts 509 are broken. The making of the connection at relay contacts 556 is not normally effective, but provides a connection for the operation of relay 564(M) should control ground from the equipment fail as explained above. The making of the connections at contacts 463, at contacts 552 and at contacts 554 (FIG. 5) will be later explained.

Thus, when relays 512(G) (FIG. 4) and 534(F) are energized, the relay 400(D) is normally de-energized; except when relay 564(M) and/or relay 455(K) are energized. The waning of the current controlling relay 400(D) de-energizes the relay 400(D) and allows contacts 413 to open to de-energize relay 315(C) as described in connection with FIG. 4. This causes the pulsing circuit including relays 313(A), 314(B), and 315(C) to again begin operation, as described previously.

*Dialing*

As the pulsing circuit previously described again operates, the relay 315(C) is alternately energized and de-energized as described above. This accomplishes the alternate breaking and making of contact 323, the alternate making and breaking of the contact 362, the alternate making and breaking of the contact 363, and the alternate breaking and making of contacts 364.

Inasmuch as relay 400(D) is de-energized, contact 411 is broken, and the circuit previously described connecting the tip spring 424 (FIG. 6) of the calling number jack 51 through the contact 411 (FIG. 4) to the ring spring 467 (FIG. 6) of the calling number jack 51 must pass through the alternate path (described above) through the contacts 362 (FIG. 4) (which, as just stated, are alternately closed and opened by relay 315(C)).

The making and breaking of the contact 362 as shown (and described in connection with the pulse generator) thus closes and opens a connection from the tip wire of the line of the calling number (connected to ground) to the ring wire of the line of the calling number (connected to negative battery). Thus, pulses are created in the equipment associated with the calling number just as if the calling number equipment were manually dialed.

*Operation of stepping switch magnet 561*

As just stated above under the heading "Dialing," as the relay 315(C) (FIG. 4) is alternately energized and de-energized, it also accomplishes the alternate making and breaking of the contact 362; alternately makes the circuit complete from the ring spring 467 to the tip spring 424 of the calling number jack 51 (FIG. 6) and breaks such circuit; and thus alternately closes and opens the circuit for the calling number equipment creating a pulse in the calling number equipment exactly the same as if the calling number equipment were being manually dialed. This pulsing would continue indefinitely were it not for provision of means for interrupting it by means of apparatus now to be described. This means includes some of the switches, jacks, relays and wiring previously described. It also includes the minor stepping switch magnets 561 (FIG. 5) and 562 (FIG. 7), the digit switches 21 to 30 inclusive (FIGS. 1, 5 and 7), contact banks and relays, all of which will later be more fully described.

Figure 7:
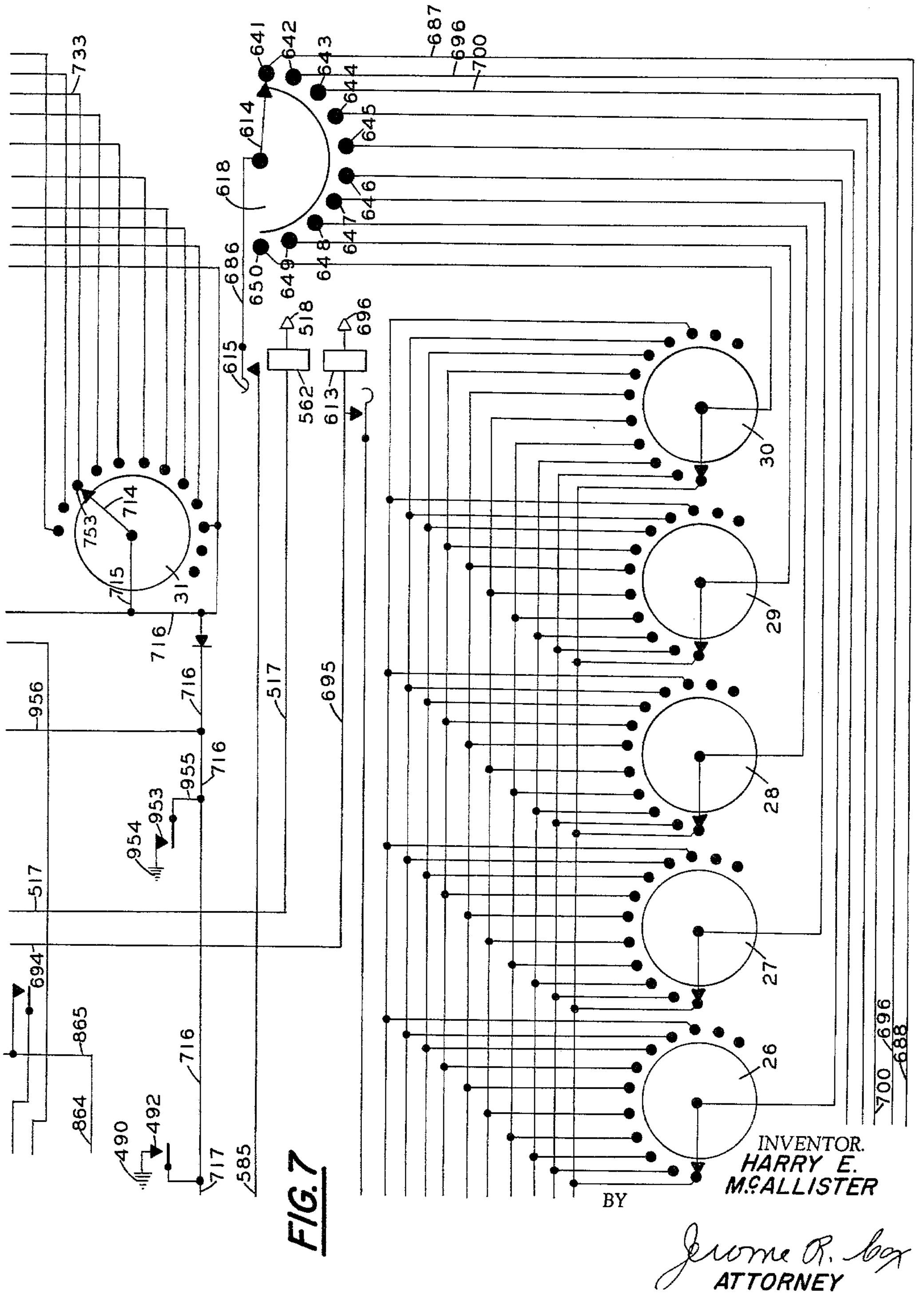
FIG. 7 is a diagram showing the wiring arrangement illustrated in the lower center of the complete wiring diagram.

Before dialing is started, the pulse generator starting switch 32 (FIG. 4) is closed, the originate call switch 33 (FIG. 4) is closed, and plugs are inserted in the calling number jack 51 (FIG. 6), and the battery and ground jack 55 (FIG. 4). Let us assume that the dial start switch 34 has not yet been closed. Relay 315(C) (FIG. 4) is energized as is relay 400(D) (FIG. 4). Relays 512(G) and 534(F) (FIG. 4) are not energized, nor is relay 455(K) (FIG. 6). Relay contacts 415 (FIG. 4) are closed because relay 400(D) is energized. Relay contacts 416 are open because of relay 400(D), and relay contacts 364 are open because of relay 315(C). Therefore no current flows to minor switch magnets 561 (FIG. 5) and 562 (FIG. 7). Now when the dial start switch 34 is closed, it closes the circuit through and energizes the relay 512(G), as explained above, which in turn energizes the relay 534(F) through contact 522 as previously described. Relay 512(G) also closes contacts 524 (FIG. 5). Relay 534(F) (FIG. 4) breaks the connections at relay contacts 405 (FIG. 5) to de-energize the relay 400(D). This in turn breaks the connection at relay contact 413 and de-energizes the relay 315(C). With the relays 512(G) and 534(F) energized, and with relays 315(C) and 400(D) de-energized, a circuit is formed from the master ground 371 (FIG. 6) to the minor switch magnet 561 (FIG. 5). The circuit is formed from the ground 371 (FIG. 6) through lead 372, contacts 373, leads 374, 375 (FIG. 4) and 376, contacts 364, the lead 596, contacts 417 (FIG. 5), lead 597, contacts 524, the lead 598, through the minor switch magnet 561 to the negative battery 599. This causes the movable wiper 611 associated with the switch magnet 561 to advance one step.

The energizing of minor stepping switch magnet 561 also moves the "rotary off normal" contacts 612 to an "on" position. These RON contacts 612 will now stay closed, until the wiper 611 is returned to its normal off position. When the wiper 611 is returned to its normal off position, however, the RON contacts 612 will be opened through a mechanical arrangement.

*De-energizing of minor switch magnet 561*

Whenever during the pulsing operation, relay 315(C) (FIG. 4) is energized, contacts 364 are broken thereby and then current ceases to flow to the magnet 561 (FIG. 5) and the minor switch stepping lever releases. However, the movable contact wiper 611 is then held in its new position. mechanically and does not go back to its initial position. Neither is the "rotary off normal" contact 612 released to its "off" position, but remains closed until positively released by return of wiper 611 to its "off" position. When the relay 315(C) is again de-energized in the pulsing cycle, the magnet 561 is again energized and the movable wiper 611 is again advanced one step. Therefore, as the pulsing cycle operates to energize and de-energize the relay 315(C) (FIG. 4), the movable contact wiper 611 (FIG. 5) is advanced one step for each pulse created by the pusing circuit. However, it should be noted that contacts 364 (FIG. 4) are not in the circuit controlling minor switch magnet 562 (FIG. 7). Thus on the second pulse, the movable wiper is advanced a second step to the position shown in FIG. 5.

If it is desired to test the correctness of the pulsing operation, a pulse meter is plugged into pulse check jack 52 (FIG. 6) by which the correctness of the pulses can be determined.

*Operation of stepping switch magnet 562*

Another circuit is formed under the same condition as explained above in the paragraph entitled "Operation of stepping switch magnet 561," which circuit may be traced from main ground 371 (FIG. 6) through normally closed contacts 373, leads 374 and 375 (FIG. 4), normally closed contact 416 (closed because the relay 400(D) has been de-energized), leads 514, contact 523 (closed by operation of the relay 512(G)), lead 515, normally closed contact 516 (FIG. 6), lead 517, to minor switch magnet 562 (FIG. 7) and thence to negative battery connection 518. This energizes minor switch magnet 562 and thus causes the movable wiper 614 (FIG. 7) associated therewith to advance one step to the position shown in FIG. 7. It also causes "rotary off normal" contact 615 to be moved to a closed position. This contact 615 will stay closed through a mechanical locking arrangement, until released by the associated release magnet 613. As stated above, the contacts 364 are not in the circuit controlling minor switch magnet 562 (FIG. 7), and the opening and closing of contacts 364 does not cause the wiper 614 to advance beyond the point shown in FIG. 7.

*Operation of digit switches*

Now I will refer to FIG. 5 mainly for description of the operation of the digit switches. As shown in FIG. 1, I normally use 10 digit switches. More may be used, if desired, or less may be used. However, in the interest of clarity and of simplifying the description, in FIG. 5 only three digit switches will be referred to. The arrangement and operation of the ten digit switches, or even more, will be obvious from the description of the three, and if more clarification is desired, reference may be made to my patent application Serial No. 762,110. Thus, of the digit switches 21–30 inclusive, we will refer only to the switches 21, 22 and 23 shown in FIG. 5, the other digits being shown but not described for simplification and clarity. Digit switch 21 is set for dialing two pulses; digit switch 22 is set for dialing one pulse; and digit switch 23 is set for dialing three pulses. The movable wiper 611 is shown in the position it assumes after it has been stepped by the minor stepping switch magnet 561 to its second contact 632. The movable contact wiper 614 (FIG. 7) is shown in the position it assumes after it has been moved by the minor stepping switch magnet 562 to its first contact 641. A ground is shown at 620 (FIG. 5) which at times (as will be later explained) is connected to magnet 561 as follows: Ground 620, contact 412, lead 624, RON switch 612, lead 625, contact 626, lead 627, lead 598, magnet 561, to negative battery 599. However, when the pulse generator is operating, the relay 400(D) is de-energized and contacts 412 are open and the above described circuit is inoperative.

It may be seen that I have shown in FIGS. 5 and 7 digit switches 21, 22 and 23, the bank contacts 631–640 inclusive of the stepping switch 617, and the bank contacts 641–650 of the stepping switch 618. Associated with such bank contacts are the movable contact wipers 611 and 614. The movable contact wiper 611 contacts in turn with the contacts 631–640 inclusive of the stepping switch 617. The movable contact wiper 614 contacts in turn with the fixed contacts 641–650 inclusive. The digit switch 21 has fixed contacts 651–660 inclusive. The digit switch 22 has fixed contacts 661–670 inclusive, and the digit switch 23 has fixed contacts 671–680 inclusive. The digit switches 21, 22 and 23 are provided with movable contact wipers 621, 622 and 623 respectively, which can be manually set at any desired position in contact with any of the fixed contacts.

As shown in FIG. 5 and as explained above, the movable contact wiper 611 has been advanced to the contact 632. The wipers 621, 622 and 623 of the digit switches 21, 22 and 23 have been set so that the wipers thereof contact the corresponding fixed contact to limit the pulsing of the unit to the number set to be dialed consisting of the three digits 2, 1, 3, in order.

When the wiper 611 of the stepping switch 617 is moved to the fixed contact 631, it does not complete any circuit (to do so, ground must be received by wiper 611 from wiper 614). Therefore, the pulsing continues and the relay 315(C) is in due course again energized. When it is energized again, it breaks the circuit by opening the contacts 364 (FIG. 4), but when it is again de-energized, it completes another circuit in the same way as explained above through the stepping switch magnet 561 (FIG. 5) and again steps the movable contact wiper 611 to the fixed contact 632. It does not operate the wiper 614 (FIG. 7). After the wiper 611 is moved to fixed contact 632, the next energization of relay 315(C) (FIG. 4) closes contact 363 and a circuit is formed as shown in FIGS. 4, 5, 6 and 7 as follows:

From the main ground 371 (FIG. 6) to the contact 373, leads 374, 375 (FIG. 4) and 376, contact 363, the lead 582, lead 583, lead 584, lead 585 (FIG. 5), contact 615 (FIG. 7) (which has been closed, as described above, by the stepping switch 562), lead 686, the movable contact wiper 614 of the stepping switch 618, the fixed contact 641, the lead 687, lead 688, lead 689 (FIG. 5), the movable contact wiper 621, which is set, as shown, in contact with the fixed contact 652, said fixed contact 652, the leads 691, 692, 693 to the fixed contact 632, the movable contact wiper 611, lead 581, lead 682, relay 681(E) (FIG. 4), and the negative battery connection 683. This energizes the relay 681(E) which closes the contact 684 and connects the ground at 685 through contact 684, leads 694, 483, 594, and 595 to relay 400(D) and negative battery 407. This energizes relay 400(D) which now closes the contacts at 413 (FIG. 4), connecting the ground at 421, through the relay 315(C) (FIG. 4) to negative battery connection 356, to hold the relay 315(C) and stopping the pulsing until after the relay 681(E) is again de-energized. Pulsing is thus also stopped to the equipment attached to the calling number jack 51.

When both the relay 400(D) and the relay 681(E) are energized, the condenser 474 (FIG. 4) is shorted out by the connection between the ground 685 (FIG. 4) and said condenser consisting of the relay contacts 684, the leads (FIG. 4) 694, 483 and 481, the relay contacts 414, and the lead 473. This guarantees that the condenser 474 will at that time be in a discharged condition.

*Other effects of energization of relay 681(E)*

The energization of relay 400(D) breaks the contact at 416 (FIG. 4) and closes the contact at 415. The breaking of the contact at 416 (FIG. 4) breaks the circuit through stepping switch magnet 562 (FIG. 7). This de-energizes the stepping switch magnet 562 but does not return the movable contact wiper 614 to its off position, this wiper being held against contact 641 by mechanical means. Nor does it release the contacts 615 which is held in a closed position by mechanical means until released positively by means later to be described. The closing of the contact 415 (FIG. 4) creates a circuit from the main ground at 371 (FIG. 6) to the wiper of the trunk "off" switch 31 (FIG. 7) as will be later described.

As stated above, the energizing of the relay 400(D) (FIG. 4) energizes the relay 315(C) and holds that relay energized from the ground 421. The energizing of the relay 315(C) breaks the connection at contacts 364 and makes a connection at contacts 363. The breaking of the connection at contacts 364 breaks the circuit from ground 371 (FIG. 6) through the stepping switch magnet 561 (FIG 5). This, however, at this time releases the magnet 561 only momentarily. When the ground at 620 is supplied through contact 412 (closed by relay 400(D)), lead 624, RON contacts 612 (held closed by mechanical means), lead 625, contact 626 (closed as soon as the magnet 561 is de-energized), lead 627, lead 598, magnet 561, to negative battery 599, magnet 561 will be caused to be energized. This breaks the contacts 626 so that magnet 561 is de-energized. Then magnet 561 is again energized in the same way. Thus, magnet 561 is alternately energized and de-energized. This causes the wiper 611 to continue to and past the fixed contacts 633X640. After it passes the contact 640, wiper 611 opens the contacts 612 by mechanical means, thus destroying the connection from the ground 620 and releasing the magnet 561. The wiper 611 is now in the "off" position.

*Further stepping by stepping switch magnets 561 and 562*

As stated above, when the wiper 611 (FIG. 5) returns to its "off" position as described above, it breaks the RON contact 612. It also breaks the circuit including the relay 681(E) (FIG. 4), thus opening the relay contacts 684 and removing the ground from the relay 400(D) so that the relay 400(D) is de-energized (after a short delay due to the charging of the condenser 474). The de-energization of the relay 400(D) allows contact 413 to open and thus breaks the connection from the ground 421 to the relay 315(C). It also allows the contacts 416 to close and thus operates the stepping switch magnet 562 (FIG. 7) again. Relay 315(C) is thus de-energized by the opening of the contact 413 and the pulsing action again starts. De-energization of the relay 315(C) closes contacts 364 and operates the magnet 561 (FIG. 5) as described above and causes the wiper 611 to be moved to the fixed contact 631. When the relay 315(C) is again energized in the pulsing action, it closes the contact 363. This creates a circuit as follows: From the main ground at 371 (FIG. 6) through the contacts 373, the leads 374, 375 (FIG. 4) and 376, the relay contacts 363, leads 582, 583, 584, 585 (FIG. 5), contacts 615 (FIG. 7), lead 686, movable contact wiper 614, fixed contact 642, lead 696, movable contact wiper 622 (FIG. 5), fixed contact element 661, movable contact wiper 611, lead 581, lead 682, through relay 681(E) (FIG. 4) to negative battery connection 683. This again energizes relay 681(E), which again in turn, as described above, energizes first the relay 400(D), then the relay 315(C), then steps the wiper 611 completely around to its "off" position and thus breaks the contact between the movable wiper 611 and the fixed contact 631, and breaks the contacts at 612. Then successively, relay 681(E) is de-energized, the relay 400(D) is de-energized, the magnet 562 (FIG. 7) is operated to step the wiper 614 to the contact 643, and the relay 315(C) is de-energized. This again forms a circuit through the stepping switch magnet 561 (FIG. 5) which closes the relay contact 612 and moves the movable wiper 611 to the contact 631. The relays 313(A) (FIG. 8), 314(B) and 315(C) are successively energized in the pulsing cycle and the energizing of the relay 315(C) breaks the contact at 364 de-energizing the magnet 561 (FIG. 5). As the pulsing continues, the relay 315(C) is de-energized and the contacts at 364 are again closed and the magnet 561 is again energized. This steps the movable wiper 611 to the contact 632, the continued pulsing energizes the relay 315(C), de-energizing the magnet 561, and again as relay 315(C) is de-energized, again energizes the magnet 561 which steps the movable wiper 611 to the fixed contact 633. When the relay 315(C) is next energized, a circuit is then formed from the main ground 371 through the relay contacts 373, the leads 374 and 375 (FIG. 4) and 376, the relay contacts 363, leads 582, 583, 584, and 585 (FIG. 5), contacts 615 (FIG. 7), the lead 686, the movable wiper 614, the fixed contact 643, leads 700, the movable wiper 623 (FIG. 5), the contact 673, leads 701, the fixed contact 633, movable wiper 611, lead 581, lead 682, relay 681, and the negative battery connection 683. Relay 681(E) energizes as explained above.

*Completion of dialing*

Because we are using only three of the digit switches 21, 22, and 23, we have set the movable wiper 714 on the third fixed contact (i.e. 753). When relay 681(E) energizes (see FIG. 4), the relays 400(D) and 315(C) energize as before. However, there is this difference. The energization of the relay 400(D) closes relay contacts 415 which through a circuit now to be described, holds the relay 681(E) energized. Thus even though the movement of the wiper 611 (FIG. 5) to the "off" position breaks the contact at contacts 631 as before, and interrupts the circuit through the wiper 611 to the relay 681(E) (FIG. 4), nevertheless the relay 681(E) is not de-energized by the return of movable wiper 611 (FIG. 5) to the "off" position because such other circuit is provided which holds relay 681(E) energized. This circuit is formed from the main ground 371 (FIG. 6) through the relay contacts 373, the leads 374 and 375 (FIG. 4), the relay contacts 415, lead 712, movable wiper 713 (FIG. 6) (which is stepped by the stepping switch magnet 562 concurrently with the stepping of the wiper 614), fixed contact 723, the lead 733, the fixed contact 753 (FIG. 7), the movable wiper 714, the leads 715, 716, 717, 718, 682, through relay 681(E) (FIG. 4) to the negative battery 683. This holds the relay 681(E) energized and through it the relays 400(D) and 315(C), and the pulsing stops.

As outlined above, the device has now pulsed the number which was set on the digit switches 21, 22 and 23, sending these pulses through the calling number jack 51 (i.e. it has dialed the number 213 which we are assuming is the called number). The telephone equipment associated with number 213 sends ringing current (A.C.) on the called number attached to the called number jack 54 and the ringing (A.C.) current is transmitted from the called number jack 54 (FIG. 6) from the ring spring 811 through leads 812, 813, capacitor 814, lead 815, lead 816, capacitor 817, through leads 818, 819, 824 and 821, contacts 552 (FIG. 4), leads 826, 827 (FIG. 6) and 828 to tip spring 830 of called number jack 54. This constitutes a charge and discharge circuit in capacitors 814 and 817. From lead 812 a second circuit is formed through lead 831, resistor 839, lead 834, contact 491 (which is controlled by relay 455(K)), lead 821 to contact 552 (FIG. 4) and thence by leads 826, 827 (FIG. 6) and 828, as above, to tip spring 830 of called number jack 54. The resistor 839 connects leads 831 and 834 and shorts out leads 812 and 828 in order to answer the connector. These circuits form an A.C. current at 841 which is forwarded by lead 842, contact 846 (FIG. 4) (controlled by relay 847(L)), lead 848 to upper coil 851 of relay 847(L) to ground at 850. This energizes the upper half 851 of relay 847(L) and closes contacts 852 (FIG. 5) and 853, and (after the lower coil 855 of relay 847(L) is energized) it opens contact 846 (FIG. 4). The effect of closing contacts 852 (FIG. 5) is to complete a circuit from ground 571 through normally open contact 525 (controlled by relay 512(G) (FIG. 4) and now closed because relay 512(G) is energized, leads 856 (FIG. 5), 857, and 857*a*, contact 852, leads 858, 859 and 861 through lower coil 855 (FIG. 4) of relay 847(L) to negative battery 862. This holds relay 847(L) energized until relay 512(G) is de-energized. The closing of contact 853 supplies ground to the sleeve 863 (FIG. 6) of the called number jack 54 as follows: From the ground 571 (FIG. 5) through contacts 525, leads 856, 857 and 857*b*, contacts 853, leads 864, 865 (FIG. 7) and 866 (FIG. 6), manual release switch 36 (FIG. 4) (assuming said switch is not operated), lead 867, and spring 868 (FIG. 6) to sleeve 863. The closing of contact 853 also energizes relay 869(H) (FIG. 6). To this end, a lead 871 is connected to lead 865 and supplies ground from 571 (FIG. 5) through relay 869(H) (FIG. 6) to negative battery at 872.

The lead 321 (FIG. 4) from the pulse generator start switch 32 is connected by leads 721 and 722 to lower coil 460 (FIG. 6) of relay 455(K) and through it to negative battery 725. Relay 455(K) controls contacts 491, 492 (FIG. 5) and 493 (FIG. 6). The operation of relay 455(K) and of the contacts controlled thereby is explained more thoroughly hereafter. However, when 455(K) is energized, it closes contacts 492 and connects ground at 490 through contacts 492 and leads 717, 718 and 682 to relay 681(E) (FIG. 4) to energize it.

During all this time the calling number equipment has been seized by the circuit inasmuch as whenever the relay 315(C) is energized, the relay contacts 362 are closed, creating a circuit through the calling number equipment. The intervals between pulses created by the cycling of relays 313(A), 314(B) and 315(C) are not sufficient to release the calling number. However, the energization of relay 869(H) (FIG. 6), as explained above, breaks the relay contact 573 long enough to break the supply of ground from ground 570 to calling number jack 51 which is supplied as previously explained under the heading "Hold feature." It also breaks contacts at 468 and (as later explained) through relay 547(F) (FIG. 4) breaks contacts 463 and 552. This releases the equipment held through the calling number inasmuch as both contacts 463 and contacts 468 (FIG. 6) are broken and one or the other must be closed to maintain the circuit holding the calling number equipment. This in turn releases the equipment associated with the called number, thus removing the ringing current from the called number circuit. Relay 512(G) (FIG. 4) is released because ground is removed from the sleeve of the calling number jack 51 (FIG. 6). The cessation of the ringing current from called number jack 54 releases the upper half 851 (FIG. 4) of relay 847(L). The deenergization of relay 512(G) breaks the contacts 525 (FIG. 5) and thus releases the lower half 855 (FIG. 4) of relay 847(L). This breaks the relay contacts 853 (FIG. 5) and releases the relay 869(H) (FIG. 6). However, while the relay 869(H) was energized, it not only (1) opened the relay contacts at 468 but also (2) made a connection at relay contacts 873, (3) broke relay contacts 373, 516 and 573, and (4) made a connection at a relay contact 370. The breaking of the contact at 373 breaks the circuits through relay 534(F) (FIG. 4) and releases that relay. When the relay 869(H) (FIG. 6) releases, it restores the connections at contacts 516, 573, 468, 373, and breaks the contacts at 873 and 370. This restores the routiner to the original condition before the calling number was seized as explained above under the heading "Operation originate calls switch."

The closing of relay contacts 370 closes a circuit from the main ground 371 through the relay contacts 370 to release magnet 613 (FIG. 7). This circuit runs from ground 371 (FIG. 6) through lead 372, contacts 370, lead 694, lead 695 (FIG. 7) magnet 613 to negative battery at 696. The circuit through the magnet 613 energizes the release magnet 613, and moves the movable contact wiper 614 back to the "off" position. The return of wiper 614 moves the rotary off normal contact 615 to the open position. The return of the wiper 614 breaks the circuit through relay 681(E) and this in turn releases relay 400(D) and relay 315(C).

*Time delay and tone features*

I provide means to hold a test call long enough to be recorded on the recording medium, it being possible to disconnect this feature if desired. When relay 869(H) (FIG. 6) is energized, master ground 371 is forwarded to the coil of relay 927(N). For this purpose a circuit is formed from master ground 371 through lead 372, contacts 370, leads 694, 922, 923, and 924 to time delay relay 927(N) and thence to negative battery 928. Relay 869(H) in opening contacts at 468 and 573 as explained just above would normally (except for this circuit) cause the call to be released. However, assuming answer hold switch 56 (FIG. 6, middle) has been operated, ground will be forwarded through contacts 936 (which are controlled by time delay relay 927(N)) to hold relay 534(F) (FIG. 4) for a short period. This circuit is formed from ground 931 (FIG. 6) through switch spring 932, lead 933, contacts 936, leads 937, leads 938, 939 (FIG. 4), 941, 942 and 538, contacts 522, leads 543, 544 and 545 and 546 to coil 547 of relay 534(F) and then to negative battery at 548. Relay 927(N) FIG. 6) is a time delay relay and will not operate until the desired time has elapsed. When it does operate, it will cause the ground at 931 to be removed from relay 534(F) by breaking the contacts at 936. Relay 534(F) (FIG. 4) will now release, breaking the contacts at 463 and causing the call to be released and a new call to be initiated.

If the time delay feature is not desired, toggle switch 56 (FIG. 6) is not operated.

The closing of contacts 370 by relay 869(H) as above described (assuming answer hold switch 56 is closed) also creates a circuit from ground 371 to relay 833(J) as follows: Ground 371, lead 372, contact 370, lead 694, leads 922, 923 and 943, switch contacts 944, lead 945, relay 833(J) to negative battery at 946. This same ground circuit continues from lead 945 through leads 947, 948 and 949, to the answer connector lamp 42 and to negative battery at 952. This illuminates lamp 42. The energization of relay 833(J) closes contacts 874 and 953 (FIG. 7) and creates a circuit from ground at 954 through contacts 953, leads 955, 716, 956, 957 and 959, primary side 961 of an induction coil to alarm 46, and through it to negative battery at 962. This causes the alarm 46 to sound. The current through the primary 961 causes an A.C. voltage to be generated in the secondary side 963 of the induction coil. This A.C. voltage will be at a frequency within the audible range and will be forwarded through an .01 mfd. condenser 960 and leads 964 and 965, and lead 466 to the ring spring 467 of the calling number jack 51.

If it is desired to use a tone other than the tone created automatically by this unit, a plug is inserted into the external tone jack 58 (FIG. 6, middle), this plug having the desired tone attached to it.

Relay 833(J) in operating will close contacts 874 and cause the 1000 ohm short 839 to be applied to the TR leads attached to the called number jack 54 which will cause the answer condition to become effective in the associated dial equipment. This is created by a circuit leading from the ring spring 811 of jack 34 to the tip spring 830 as follows: From the ring spring 811 through leads 812 and 831, through the 1000 ohm 5 watt resistance 839, lead 835, contacts 874 (closed by relay 833(J)), leads 823, 824 and 821, contacts 552 (FIG. 4), leads 826, 827 (FIG. 6) and 828, to tip spring 830.

With relays 534(F) (FIG. 4) and 833(J) (FIG. 6) both held energized while time delay relay 927(N) is holding, the associated dial equipment will be held. When relay 927(N) eventually operates, it allows relay 534(F) (FIG. 4) to release. Thus the associated dial equipment is allowed to release. This interrupts the ground on the sleeve of 501 of the calling number jack 51 (FIG. 6) and releases relay 512(G) (FIG. 4). This allows the opening of contacts 525 (FIG. 5) and releases relay 847(L) (FIG. 4). The release of relay 847(L) opens contacts 852 (FIG. 5) and 853 and thus releases relay 869(H) (FIG. 6). The release of relay 869(H) opens contacts 370 and thus breaks the connection between the ground 371 and relay 833(J) and thus releases relay 833(J). The return of the wiper 614 has released relay 681(E) and through it relay 400(D) and 315(C). As soon as the relays 315(C), 400(D), 681(E), 534(F), 512(G), 869(H), 833(J) and 847(L) have released, the apparatus is back in the same condition that it was when dialing was commenced, and the dialing is ready to be repeated.

*Multiple selector unit*

Figure 8:
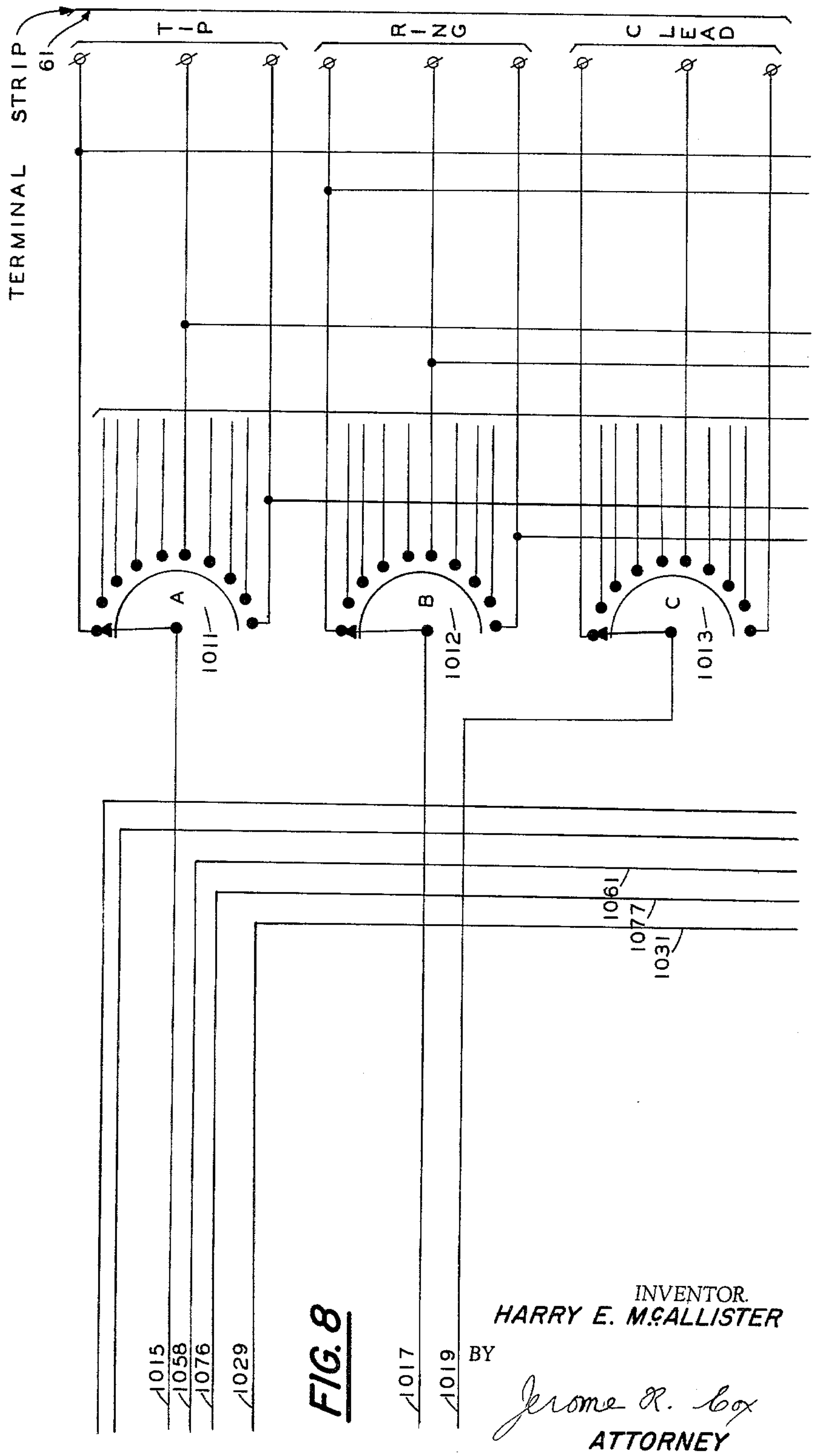
FIG. 8 is a diagram showing the wiring arrangement illustrating the upper right of the complete wiring diagram.
Figure 9:
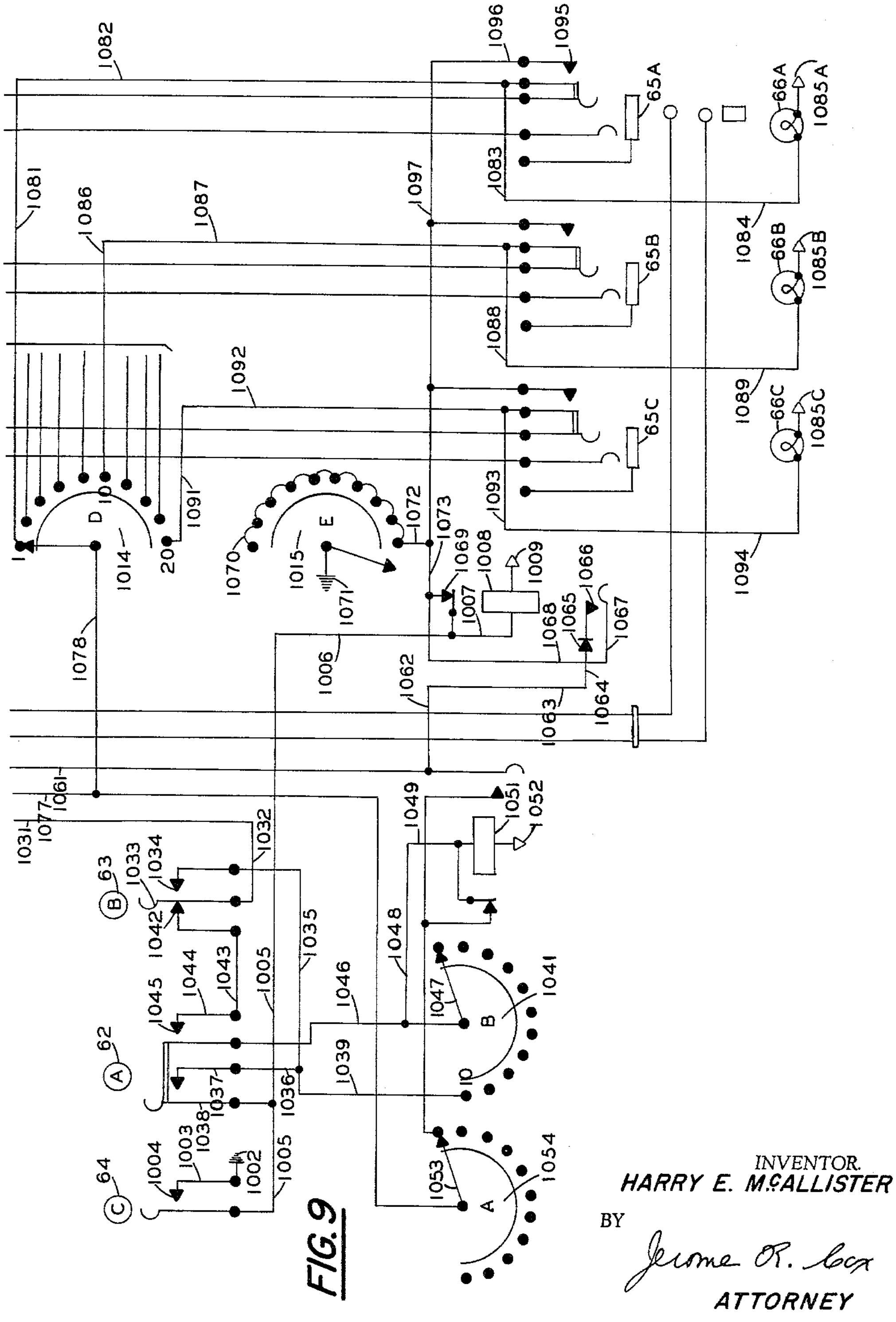
FIG. 9 is a diagram showing the wiring arrangement illustrating the lower right of the complete wiring diagram.

I refer now especially to FIGS. 8 and 9 for an explanation of my multiple line selector unit. By the use of this unit I may optionally make all calls from the same selected test number, or optionally I may make each call successively from a different one of a plurality of selected test numbers, or optionally I may make a predetermined number of calls (as for example 10) from one number and then make the same number of calls from each of the other selected test numbers in succession. First a "dummy" plug is inserted into the calling number jack 51.

In order to make all successive calls from the same test line number, I operate toggle switch 64(C) (FIG. 9) manually until the desired test line is selected. Operation of switch 64 forms a circuit from ground 1002, lead 1003, contract 1004 of switch 64, leads 1005, 1006 and 1007, minor switch 1008 (ROT–MS3) to negative battery 1009. This energizes switch 1008 and steps the movable contacts of each of switches 1011(A) (FIG. 8), 1012(B), 1013(C), 1014(D) (FIG. 9), and 1015(E) each forward one fixed contact. Successive operation of switch 64 steps the five movable contacts clockwise. Movable contacts of 1011(A), 1012(B), 1013(C) and 1014(D) move to succeeding fixed contacts until the desired line is reached.

Each of the fixed contacts of switch 1011(A) (FIG. 8) is attached through terminal strip 61 to the tip connection of one of the test lines to be used, the separate contacts being each connected to a separate line in succession. Similarly, the fixed contacts of switch 1012(B) are attached to the ring connections of the same test lines in the same order as the corresponding contacts of switch 1011(A). Also the fixed contacts of switch 1013(C) are similarly connected to the C leads. There may be and preferably are, 20 fixed contacts in each of the switches 1011(A), 1012(B) and 1013(C) and thus these switches may be optionally connected to the tip, ring, and C leads respectively of any selected one of 20 test lines. These switches 1011(A), 1012(B) and 1013(C) are connected to the tip, ring and C leads of the calling number jack 51 (FIG. 6) as now explained. The tip spring 424 of jack 51 is connected by leads 431, 1014 and 1015 to switch 1011(A) (FIG. 8); the ring spring 467 (FIG. 6) of jack 51 is connected by leads 466, 1016 and 1017 to switch 1012(B) (FIG. 8); and the C lead 501 (FIG. 6) is connected by leads 502, 1018 and 1019 to switch 1013(C) (FIG. 8).

After operating the manual switch 64 (FIG. 9) to cause the stepping of the switches 1011(A), 1012(B) and 1013(C) to reach the desired test number, the manual switch 64 is not further operated and switches 62 and 63 are left open. The test dialing is therefore accomplished with the selected number in the manner previously described herein, the selected number being connected to the calling number jack 51 (FIG. 6) through the terminal strip 61 (FIG. 8) just as though a plug connected to such selected number were plugged in the calling number jack 51.

To make successive calls on several or all of the test lines, the switches 62(A) (FIG. 9) and 63(B) are operated. Whenever a call is completed satisfactorily and ringing current is returned from the called number jack as explained above in the section under "Completion of dialing," relay 847(L) (FIG. 4) is energized. Whenever relay 847(L) is energized, it will forward ground 571 (FIG. 5) through contacts 525, leads 856 and 857 and **857*b*, contacts 853, leads 864, 865 (FIG. 7), 866 (FIG. 6), manual release switch 36 (FIG. 4), spring 870, leads 867, 1025 (FIG. 6) and 1026, calls completed meter 44 to negative battery 1027. This of course operates calls completed meter 44. Also, provided switches 62(A) (FIG. 9) and 63(B) are closed, this ground is also forwarded as above to lead 1025 (FIG. 6) and then through leads 1028, 1029, 1031 (FIG. 8) and 1032 (FIG. 9) to spring 1033 of switch 63(B), contact 1034 of switch 63(B), leads 1035 and 1036, spring 1037 of switch 62, contact 1038 thereof, leads 1005, 1006 and 1007 to minor switch 1008 (ROT–MS3) and to negative battery at 1009. This operates minor switch 1008 and will step the stepping switches 1011–1013 (FIG. 8), inclusive, to the next test line number. Lead 1035 (FIG. 9) is also connected through lead 1039 to the number 10 fixed contact of stepping switch 1041**(B) for purposes later described.

I may also make a predetermined number of successive test calls from the same test line and then step to a different test line number, etc. For example, I may make 10 calls from each number and then step to a different test line and make 10 calls from the second number, etc. In order to do this, I operate toggle switch 62(A) but do not operate toggle switch 63(B). Thereupon the ground forwarded on leads 1031 and 1032 and spring 1033 flows through contact 1042, lead 1043, spring 1044, contact 1045 and lead 1046 to the movable contact 1047 of stepping switch 1041(B). It also flows through leads 1048 and 1049, minor switch 1051 (ROT–MS–4) and through it to negative battery at 1052. This energizes switch 1051. Energization of switch 1051 steps the movable contact or wiper 1047 of stepping switch 1041 (B) one step to the next fixed contact. It also steps a similar movable contact or wiper 1053 of stepping switch 1054 to the next fixed contact thereof.

When the wiper 1047 reaches the contact number 10 of switch 1041, a circuit is formed from ground 571 through elements previously detailed to lead 1033, contact 1042, lead 1043, spring 1044, contact 1045, lead 1046, wiper 1047, the fixed contact number 10 of switch 1041, lead 1039, lead 1036, spring 1037, contact 1038, leads 1005, 1006 and 1007 to switch 1008 and negative ground 1009. This steps the switches 1011 (FIG. 8), 1012, 1013, 1014 (FIG. 9) and 1015 to seize a new number to be used as the calling number (i.e. to select a new test line number). This then will be dialed 10 times and the process will be repeated.

During these operations we have maintained a dummy plug is calling number jack 51 (FIG. 6). This has disconnected ground 1055 from spring 1056. If at any time it is desired to interrupt or reset the wipers of switches 1011–1015 of the multiple line selector, the dummy plug is removed from jack 51. If the wipers are on the number 1 contacts of the switches 1011–1015, this has no effect because at such times the RON contacts 1066 (FIG. 9) are held open mechanically. However, if the wipers are on any of the contacts 2 to 20 inclusive, then the RON contacts 1066 (FIG. 9) associated with switch 1008 are closed mechanically and a circuit is formed from ground 1055 (FIG. 6) through spring 1056, leads 1057, 1058, 1061 (FIG. 8), 1062 (FIG. 9), 1063 and 1064, rectifier 1065, contacts 1066, leads 1067 and 1068, contact 1069, lead 1007, switch 1008 to negative battery 1009. This continues to step the wipers until they reach contacts number 20 of their respective switches. As explained below, any time the wipers of switches 1011 to 1014 reach contacts 20 thereof, they are immediately returned to contacts 1. When the wipers of switches 1011, 1012, 1013 and 1014 reach contact 1, the contacts 1066 are opened mechanically and the circuit is broken. This destroys the circuit above described through contacts 1066 and thus de-energizes switch 1008 and at such time stops further stepping of wipers of switches 1011(A), 1012(B), 1013(C), 1014(D) and 1015(E) thereby.

If at any time the wipers of switches 1011(A), 1012 (B), 1013(C) and 1014(D) are advanced to the fixed contacts 20 thereof, the wiper of switch 1015(E) will have advanced from the position shown to the contact 1070 thereof. This creates a circuit from ground 1071 through said wiper and fixed contacts (which are all inter-conected), the leads 1072 and 1073, the contacts 1069, the lead 1007, the switch 1008 to negative battery 1009. This steps all of the switches 1011(A), 1012(B), 1013(C), 1014(D) and 1015(E). The contacts of switch E being inter-connected, this stepping continues until the wipers of switches 1011–1015 inclusive all reach the position shown in FIGS. 8 and 9 (i.e., the wipers of switches 1011–1014 reach the contact numbered 1 and the wiper of switch 1015 reaches the "off" position shown in FIG. 9).

Assuming a dummy plug has been inserted in the calling number jack 51 (FIG. 6) as stated above, the ground 1055 is disconnected from spring 1056. However, it is then connected to contact 1074. At such times a circuit is created as follows: From the ground 1055 through contact 1074, leads 1075, 1076, 1077 (FIG. 8) and 1078 (FIG. 9), the wiper of switch 1014(D), the fixed contacts thereof to the lamp indicating the line being tested (e.g., the contact No. 1), the leads 1081, 1082, 1083, 1084, and lamp 66*a* and to ground 1085*a* associated therewith. This illumines the lamp 66*a* and indicates that the telephone equipment associated with the first calling number being tested is the one which is, during the present cycle, actually being tested. Again, for example, when the wiper associated with switch 1014(D) has moved to contact number 10 for example, a similar circuit is formed from ground 1055 (FIG. 6) through contact 1074, leads 1075, 1076, 1077 (FIG. 8), and 1078 (FIG. 9), the wiper of switch 1014(D), the fixed contact No. 10, the leads 1086, 1087, 1088 and 1089 through lamp 66*b* to negative battery 1085*b*. Similarly, when the wiper moves to contact No. 20, a similar circuit is formed from ground 1055 (FIG. 6), the wiper of switch 1014(D) (FIG. 9), the fixed contact No. 20, the leads 1091, 1092, 1093 and 1094 through lamp 66*c* to negative battery 1085*c*. Similar circuits are formed through all the other fixed contacts 2–9, and 11–19, to illuminate the lamps associated therewith.

If plugs have been inserted in the jacks 65 (e.g., dummy plugs), other circuits are formed wherever such plugs are inserted. One example should suffice for all. Thus a circuit is formed from the ground 1055 (FIG. 6) through contact 1074, leads 1075, 1076, 1077 (FIG. 8) and 1078 (FIG. 9), the wiper of switch 1014(D), the fixed contact No. 1, the leads 1081, 1082, the contacts 1095, the leads 1096, 1097 and 1073, the contacts 1069, the lead 1007, the stepping switch 1008 (MS–3) to negative battery at 1009. This steps all of the stepping switches 1011–1015 inclusive so that the line in question is skipped.

*General operation*

As described under 'Preparation for operation," initially all seven of the toggle switches 32–38, inclusive, are set in their "off" position; a battery plug is connected; the calling number selected is connected to the calling number jack 51, or the several calling numbers to be tested are connected to the terminal strip 61; and the called number is connected to the called number jack 54. The digit switches 21–30 and the trunk off switch 31 is set and the pulse generating starter toggle switch 32 is turned on.

As described under "Pulse generator," this starts the relays 313(A), 314(B), and 315(C) running, providing for pulse generation and flashing of the lamp 41.

Next the originate calls switch 33 is closed. This seizes the equipment attached to the calling number jack 51. It also energizes relay 400(D). This holds relay 315(C) energized and maintains the lamp 41 as a steady light as explained under "Operation of originate calls switch."

Next the dial start toggle switch 34 is closed. This energizes relay 512(G). Energization of relay 512(G) energizes relay 534(F) and operates originate calls meter 43. Relay 534(F) releases relay 400(D) after a delay due to condenser 474, all as explained under "Operation of relay G." The release of relay 400(D) releases relay 315(C).

Should ground on the control lead of the seized equipment fail, relay 564(M) is operated in series with relay 512(G), ground 570 is forwarded to the telephone equipment to keep it from releasing, and to hold it for inspection by the operating personnel, as explained under "Hold feature."

Should a stop dial condition be encountered, relay 455(K) will be operated. This energizes relay 681(E), and consequently 400(D). It causes alarm 46 to sound. This is explained above under "Stop dial feature."

The operation of relay 534(F) normally, except when relay 564(M) or relay 455(K) are energized, de-energizes relay 400(D) as above stated, and de-energizes relay 315(C) to allow the pulsing relays 313(A), 314(B) and 315(C) to start operating.

As explained under "Dialing," this causes the circuit through the telephone equipment of the calling number to be alternately made and broken (i.e., pulsed) just as if the telephone were being dialed manually.

The energization of relay 315(C) and its subsequent de-energization in the pulsing operation after starting switch 32, originate call switch 33, and dial start switch 34 are closed, and after relay 534(F) and relay 512(G) are energized thereby, and relay 400(D) is de-energized thereby, creates a circuit through switch magnet 561 and energizes it at each pulse to advance the wiper 611 one step. The first energization thereof also closes contacts 612. The wiper 611 is held advanced mechanically and the contacts 612 are held closed mechanically even though the magnet 561 is de-energized by the energization of relay 315(C). So the contacts 612 remain closed, and the wiper 611 advances one step for each pulse. The above is explained more thoroughly in the sections entitled "Operation of stepping switch magnet 561" and "De-energization of minor switch magnet 561."

As explained in detail under "Operation of stepping switch magnet 562," under the same conditions are prevailed in the last paragrah with relays 534(F) and 512(G) energized and relay 400(D) de-energized, the minor switch magnet 562 is energized to move the movable wiper 614 one step and close the contact 615. After the wiper 614 is moved, it is held at its new position mechanically until positively released, and contact 615 is held closed mechanically until positively released. The energization of magnet 562 is controlled by relay 400(D) and the pulsing of 315(C) has no effect on it.

As explained under "Operation of digit switches" and under "Other effects of energization of relay 681," the digit switches 21–30 are set manually for the numbers to be dialed. When the number set on the first digit switch (e.g. two) has been dialed, the next energization of relay 315(C) completes a circuit through relay 681(E), energizes it, thereby energizes relay 400(D), holds relay 315(C) energized, and stops pulsing until relay 681(E) is de-energized. The energization of relay 315(C) again breaks the circuit through minor switch magnet 561, but it is de-energized only momentarily because a circuit through contacts 612 and 626 (closed when 561 is de-energized) immediately re-energizes it and, as explained below, causes the wiper 611 to continue to and past the fixed contacts 640. The wiper then opens the contacts 612 mechanically and releases the magnet 561.

The movement of the wiper 611 past the contact corresponding to that for which the appropriate digit switch is set breaks the circuit through relay 681(E), thus after a short period of time (determined by condenser 474) de-energizes relay 400(D) and relay 315(C). De-energization of relay 400(D) operates the stepping magnet 562 again. Operation of relay 315(C) operates the stepping magnet 561 again. In due time, as before, relay 681(E) is again energized, which energizes relay 400(D) and holds 315(C) energized. This steps the wiper 611 around to its off position as before, breaks the contacts at 612 and de-energizes 681(E) as before. During all this time, the contacts 615 are held closed mechanically and the wiper 614 is held at the farthest position to which it is advanced. This pulsing continues until interrupted, as explained below. The above is explained more fully in the section entitled "Further stepping by stepping switch magnets 561 and 562."

As explained under "Completion of dialing," when the wiper 713 reaches the position corresponding to the position at which the trunk-off wiper 714 is set, it creates a circuit which holds the relay 681(E) energized even though the circuit through the wiper 611 which originally energized the relay 681(E) is broken when the wiper 611 is moved to its off position. The holding of relay 681(E) also holds relays 400(D) and 315(C) energized and pulsing stops. The number of the called number having been pulsed, ringing current is sent from the called number jack to the routiner and supplies current to relay 847(L). This energizes relay 847(L), which energizes relay 869(H). The energization of relay 869(H) breaks the supply of ground to the calling number jack 51 and thus releases the telephone equipment which removes the ringing current from the called number jack 54. Thus relay 512(G) is released (by the cessation of ground to the calling number), and relay 847(L) is released (1) by the cessation of ringing current at the called number jack 54, and (2) by the de-energization of relay 512(G). This releases relay 869(H). The relay 869(H) while energized created a circuit through release magnet 613, moving the wiper 614 back to its off position and opening RON contact 615.

As explained above, and also under "Time delay and tone feature," the relay 869(H) normally releases relay 534(F), and through it releases the calling number equipment. An alternate circuit is provided to hold the relay 534(F), but this alternate circuit is controlled by time delay relay 927(N) which in turn is controlled by relay 869(H). Thus the circuit is held for a short time, but as soon as the time delay expires, relay 927(N) breaks the circuit and releases relay 534(F) and the telephone equipment connected at the calling number jack 51. Energization of relay 869(H) also energizes relay 833(J) and illuminates answer connector lamp 42. The energization of relay 833(J) creates a circuit through coil 961 and alarm 46. The current through coil 961 creates an audible signal for the telephone operator to indicate that the call is a test call and need not be charged. The operation of relay 833(J) applies a 1000 ohm short to the TR leads of the called number jack 54. When relay 927(N) eventually energizes, it allows relay 534(F) to release. This interrupts the ground on the calling number jack 54 and releases relay 512(G) and releases relay 847(L). This releases relay 869(H). This releases relay 833(J). The return of wiper 614 has released relay 681(E), and through it relays 400(D) and 315(C). The release of 869(H) and 927(N) de-energizes relay 534(F). This resupplies ground to the telephone circuit and re-energizes relay 512(G). The apparatus is ready to repeat dialing.

The above is an explanation of the operation where only one calling number line is being tested. If it is desired to test a plurality of lines, this may be done as explained under the heading, "Multiple selector unit." In such case, the tip, ring and control leads of each of the lines to be tested are connected to the terminal strip and a dummy plug is inserted in calling number jack 51.

Operation of toggle switch 64(C) alone steps wipers of switches 1011(A), 1012(B), and 1013(C) so that each of these lines is connected in succession as if a plug therefor were connected in at the calling number jack. If, however, successive calls are to be made to all of the selected numbers, then switches A and B are operated instead of C, which automatically through the connections detailed and the stepping switches (shown in FIGS. 8 and 9, such as especially switch 1008), step the movable contacts of the switches 1011–1015 after each call is completed.

If it is desired to make a specified number of calls on each line, as for example 10, and then move on to the next number, etc., toggle switch 62(A) only is operated. This operates the switch 1051 to move the movable contact 1047 one step at a time until it reaches fixed contact "10" whereupon the switch 1008 is operated to move the movable contacts of switches 1011–1015 one step.

It is to be understood that the above described embodiments of my invention are for the purpose of illustration only, and various changes may be made therein without departing from the spirit and scope of the invention.

I claim:

1. An automatic dialing routiner and grade of service recorder for operating and testing certain selected telephone equipment having a plurality of subscribers' lines and having pulse responsive equipment operable to establish a connection between any two subscribers' lines; said routiner and recorder comprising in combination means for seizing the equipment associated with a selected subscriber's line;

means for creating pulses in said routiner and trans mitting pulses from said routiner to said selected subscriber's line;

means including a plurality of stepping switches for controlling the pulses transmitted to said selected telephone equipment so that pulses representing a selected number are transmitted to said telephone equipment; and means effective upon the correct pulsing of the selected number for creating an audible tone in the routiner which is transmitted to the selected telephone equipment so that an operator may recognize that the call is a test call and correct the records accordingly.

2. An automatic dialing routiner and grade of service recorder for operating and testing certain selected telephone equipment having a plurality of subscribers' lines and having pulses responsive equipment operable to establish a connection between any two subscribers' lines; said routiner and recorder comprising in combination means for seizing the equipment associated with a selected subscriber's line;

means for creating pulses in said routiner and transmitting pulses from said routiner to said selected subscriber's line;

means including a plurality of stepping switches for controlling the pulses transmitted to said selected telephone equipment so that pulses representing a selected number are transmitted to said telephone equipment; and means effective upon the correct pulsing of the selected number for (1) releasing the telephone equipment, (2) re-seizing the telephone equipment and transmitting the pulses representing the same selected number again and repeating such cycle a predetermined number of times, (3) again releasing the equipment, (4) seizing the telephone equipment associated with a second subscriber's line, (5) transmitting thereto the pulses representing the selected number of said second subscriber's line, and (6) repeating such cycle with said second subscriber's lines a predetermined number of times.

3. An automatic dialing routiner and grade of service recorder for operating and testing certain selected telephone equipment having a plurality of subscribers' lines and having pulse responsive equipment operable to establish a connection between any two subscribers' lines; said routiner and recorder comprising in combination means for seizing the equipment associated with a selected subscriber's line;

means for creating pulses in said routiner and transmitting pulses from said routiner to said selected subscribers' lines;

means including a plurality of stepping switches for controlling the pulses transmitted to said selected telephone equipment so that pulses representing a selected number are transmitted to said telephone equipment;

means effective upon the correct pulsing of the selected number for releasing the telephone equipment from the seizure by said routiner; and means effective upon the failure of ground upon the control line of the telephone equipment seized for supplying ground from the routiner to said control line of the telephone equipment for preventing the transmission of further pulses from said routiner to said equipment associated with the selected subscriber's line, for preventing the release of the telephone equipment from the seizure by said routiner, and for holding the telephone equipment seized for examination by maintenance personnel.

4. An automatic dialing routiner and grade of service recorder for operating and testing certain selected telephone equipment having a plurality of subscribers' lines and having pulse responsive equipment operable to establish a connection between any two subscribers' lines; said routiner and recorder comprising in combination means for seizing the equipment associated with a selected subscriber's line;

means for creating pulses in said routiner and transmitting pulses from said routiner to said selected subscriber's line;

means including a plurality of stepping switches for controlling the pulses transmitted to said selected telephone equipment so that pulses representing a selected number are transmitted to said telephone equipment; and means comprising an external tone jack effective upon the correct pulsing of the selected number for creating an audible tone in the routiner which is transmitted to the selected telephone equipment so that an operator may recognize that the call is a test call and correct the records accordingly.

5. An automatic dialing routiner and grade of service recorder for operating and testing certain selected telephone equipment having a plurality of subscribers' lines and having pulse responsive equipment operable to establish a connection between any two subscribers' lines; said routiner and recorder comprising in combination means for seizing the equipment associated with a selected subscriber's line;

means for creating pulses in said routiner and transmitting pulses from said routiner to said selected subscriber's line;

means including a plurality of stepping switches for controlling the pulses transmitted to said selected telephone equipment so that pulses representing a selected number are transmitted to said telephone equipment; and means effective upon the reversal of the electric potential on the tip and ring leads of the telephone equipment for seizing such equipment and holding it for inspection by maintenance personnel.

6. An automatic dialing routiner and grade of service recorder for operating and testing certain selected telephone equipment having a plurality of subscribers' lines and having pulse responsive equipment operable to establish a connection between any two subscribers' lines and having means for creating a stop dial condition in said equipment; and routiner comprising in combination means for seizing the equipment associated with a selected subscriber's line;

means for creating pulses in said routiner and transmitting pulses from said routiner to said selected subscriber's line;

means including a plurality of stepping switches for controlling the pulses transmitted to said selected telephone equipment so that pulses representing a selected number are transmitted to said telephone equipment;

means in said routiner for recognizing a stop dial condition in said telephone equipment; and means in said routiner responsive to recognition of the stop dial condition in the telephone equipment for halting the transmittal of pulses therefrom to said telephone equipment.

References Cited by the Examiner

UNITED STATES PATENTS

| | | | |
|---|---|---|---|
| 2,293,611 | 8/1942 | Meeds | 179—175.2 |
| 2,680,161 | 6/1954 | Clement | 179—175.2 |
| 2,697,140 | 12/1954 | Cornell et al. | 179—175.2 |
| 3,047,679 | 7/1962 | Pharis et al. | 179—175.2 |
| 3,069,512 | 12/1962 | McAllister | 179—175.2 |

ROBERT H. ROSE, *Primary Examiner.*

F. N. CARTEN, *Assistant Examiner.*